(12) United States Patent  
Shan et al.

(10) Patent No.: US 8,374,982 B2  
(45) Date of Patent: Feb. 12, 2013

(54) SYSTEM AND METHOD FOR CONSTRUCTING FORECAST MODELS

(75) Inventors: Jerry Z. Shan, Palo Alto, CA (US); Rajan Lukose, Oakland, CA (US); Henri J. Suermondt, Sunnyvale, CA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 12/687,458

(22) Filed: Jan. 14, 2010

(65) Prior Publication Data

US 2011/0173144 A1 Jul. 14, 2011

(51) Int. Cl.  
*G06F 15/18* (2006.01)  
*G06F 17/00* (2006.01)  
*G06F 17/50* (2006.01)  
*G06F 7/48* (2006.01)

(52) U.S. Cl. .................. 706/45; 706/12; 703/2; 703/6

(58) Field of Classification Search .................. None  
See application file for complete search history.

(56) References Cited

U.S. PATENT DOCUMENTS

| | | | |
|---|---|---|---|
| 6,839,680 | B1 | 1/2005 | Liu et al. |
| 7,072,863 | B1 * | 7/2006 | Phillips et al. .............. 705/36 R |
| 2003/0101449 | A1 | 5/2003 | Bentolila et al. |
| 2003/0236738 | A1 * | 12/2003 | Lange et al. .................... 705/37 |
| 2008/0126176 | A1 | 5/2008 | Iguchi |

OTHER PUBLICATIONS

Fenstermacher et al.; "Mining Client-Side Activity for Personalization" Department of Management Information Systems, Eller College of Business and Public Administration, University of Arizona, Jun. 2002.

Baoyao, Zhou; "Intelligent Web Usage Mining" Nanyang Technological University, Division of Information Systems, School of Computer Engineering, 2004.

Baynote Inc.: "The Collective Intelligence Platform," Online, http://www.baynote.com/technology/platform/ 2010.

Hottolink Inc.; "Recognize" Online, http://www.hottolink.co.jp/english/reconize.html, 2009.

Andrejko et al.: "User Characteristics Acquisition from Logs with Semantics" 8. Slovak University of Technology in Bratislava.

Hongjun Lu et al: "Extending a Web Browser with Client-Side Mining," Hong Kong University of Science and Technology Department of Computer Science, Clear Water Bay, Kowloon, Hong Kong, China, 2003.

Shankar et al.; "Personalized Web Search Based on Client Side Ontology", CS 498: B.Tech Project, 10. IIT Kanpur, India 2010.

Sendhikumar et al.; "Personalized ontology for web search personalization" 1. Anna University, Chennai, India , 2008.

Shahabi et al.; "Yoda an Accurate and Scalable Web based Recommendation System?" University of Southern California, Los Angeles, Sep. 2001.

Why Wubat? Website User Behavior & Analysis Tool, Wubat, Online, http://www.wubat.com/, Copyright: 2008.

(Continued)

*Primary Examiner* — Alan Chen

(57) ABSTRACT

Embodiments of the present invention include a computational forecasting system that includes an identity of a dependent variable of interest and identities of a plurality of candidate indicators along with historical data or stored references to historical data, forecast-problem parameters stored in an electronic memory of the one or more electronic computers, an independent-variable selection component that generates correlations to the dependent variable of interest and lag times for the candidate indicators, and uses the generated correlations and lag times to select a number of the candidate indicators as a set of independent variables, and a model-generation component that, using a regression method, generates forecast models for the dependent variable of interest until a model that meets an acceptance criterion or criteria is obtained.

20 Claims, 15 Drawing Sheets

OTHER PUBLICATIONS

Claypool et al.; "Implicit Interest Indicators", 14. Worcester Polytechnic Institute, Worcester, Computer Science Department Worcester Polytechnic Institute Worcester, MA 01609, USA., 2001.

Shahabi et al.; "A Framework for Efficient and Anonymous Web Usage Mining Based on Client-Side Tracking," 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook investor backs Chattertrap, a personal assistant for content, Jun. 28, 2010.

* cited by examiner

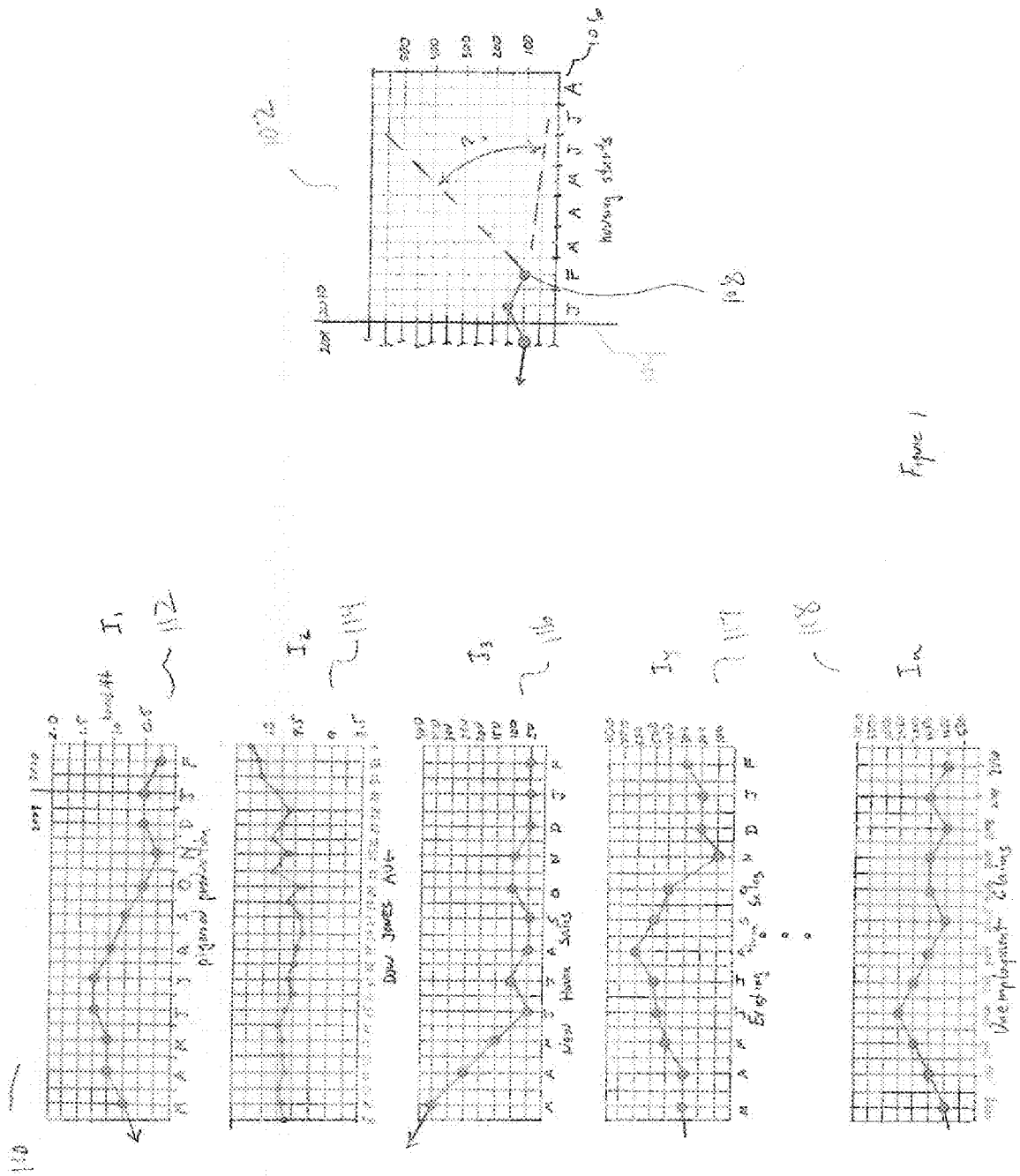

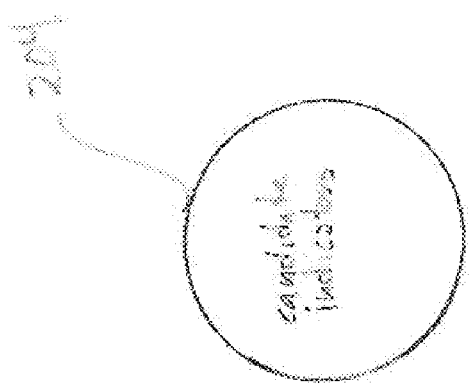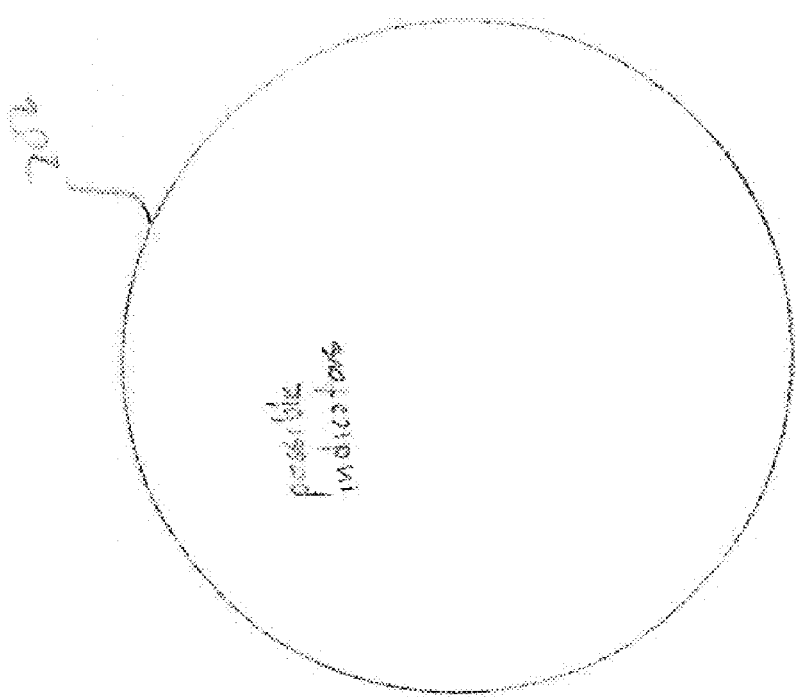
Figure 2

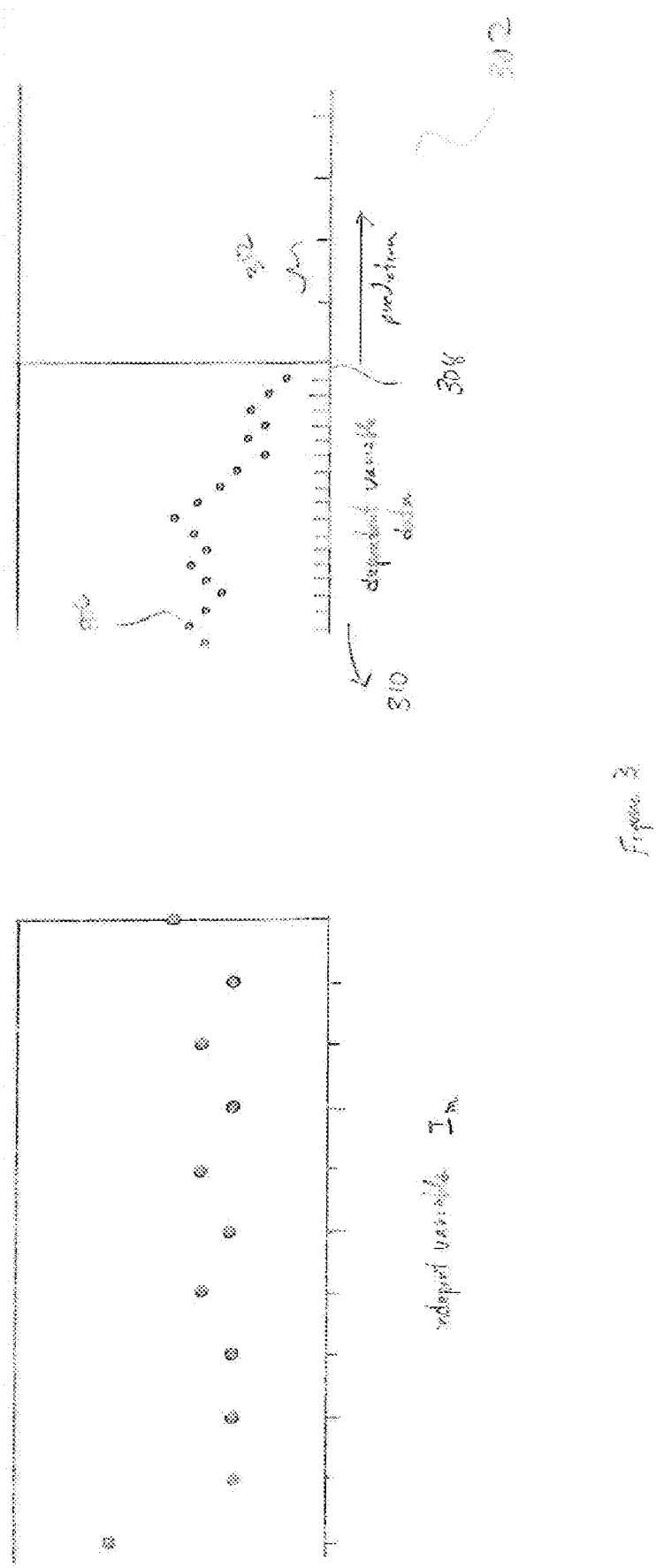

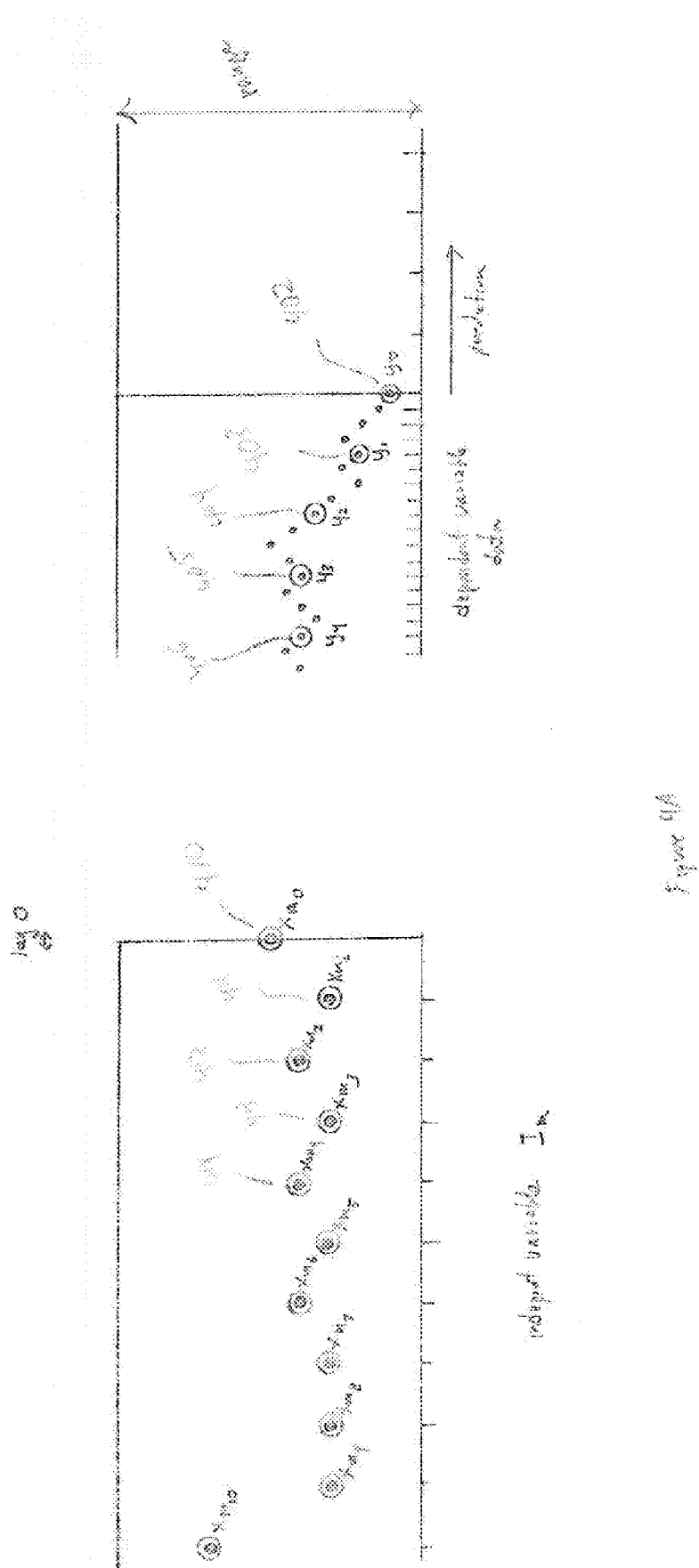

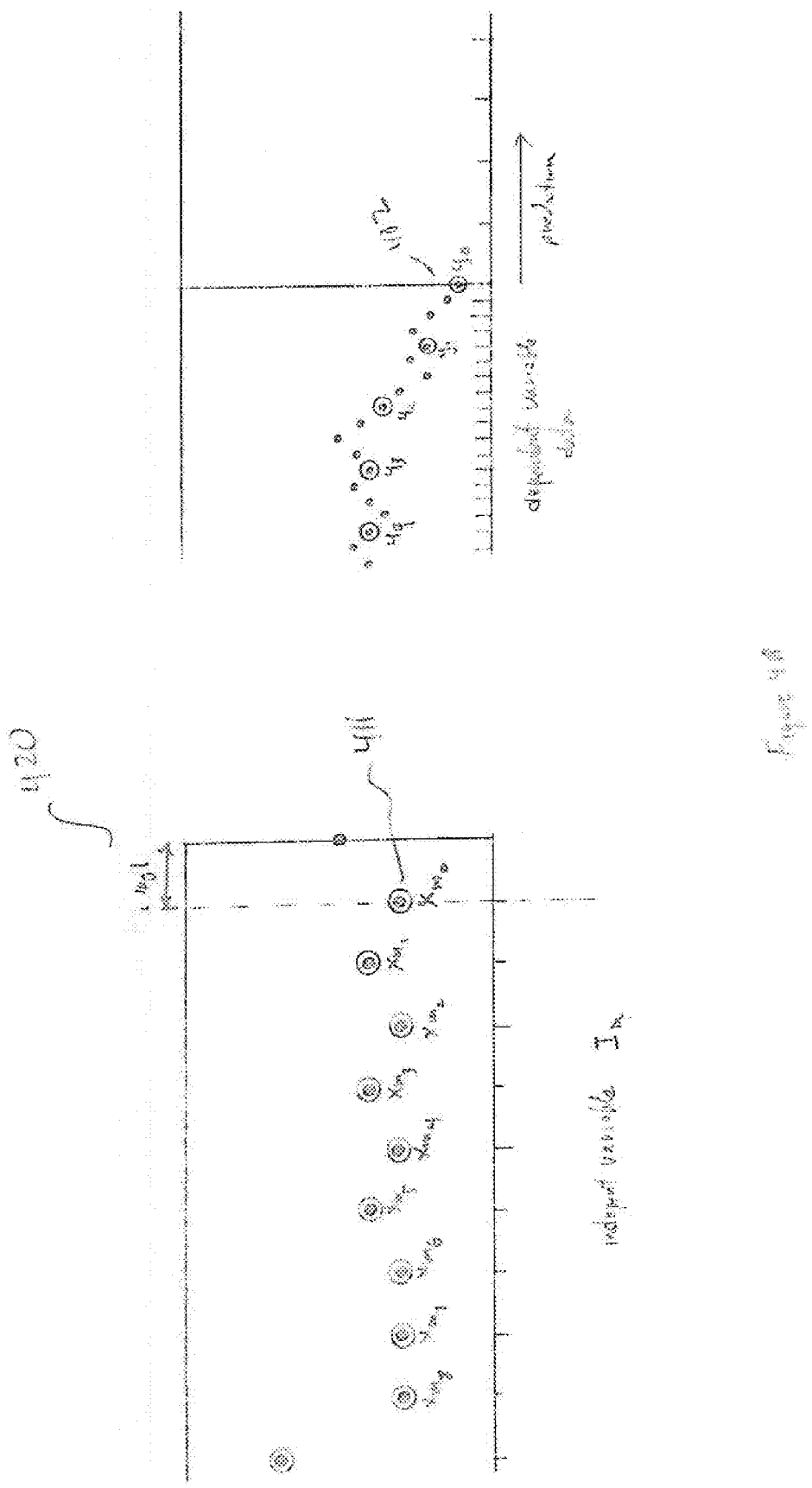

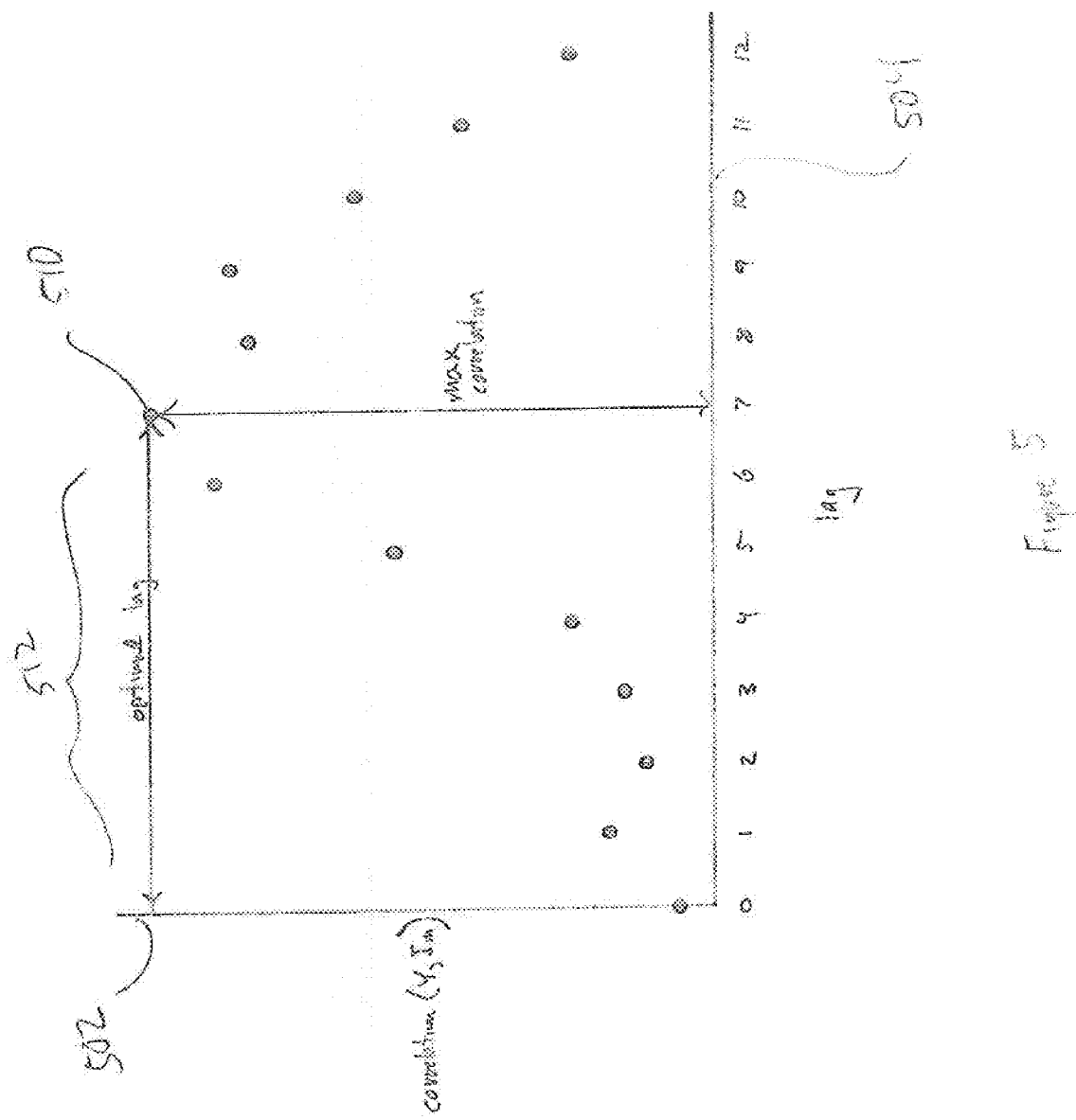

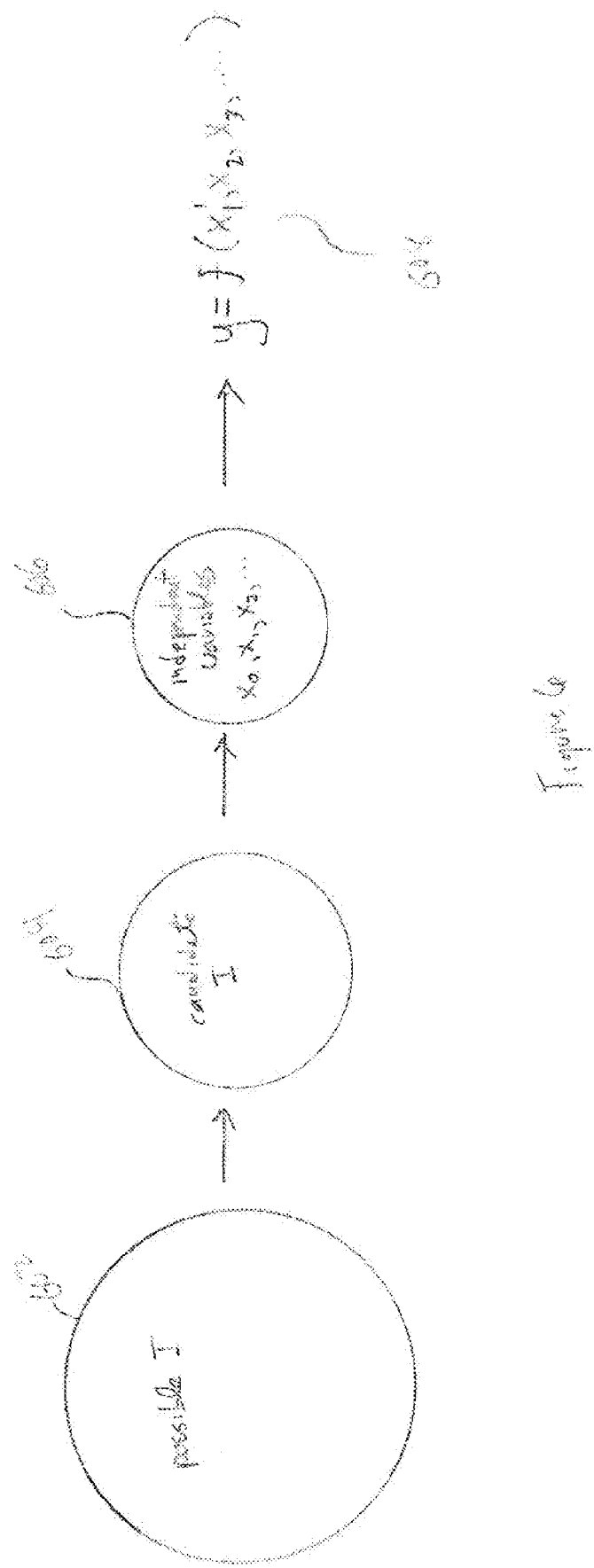

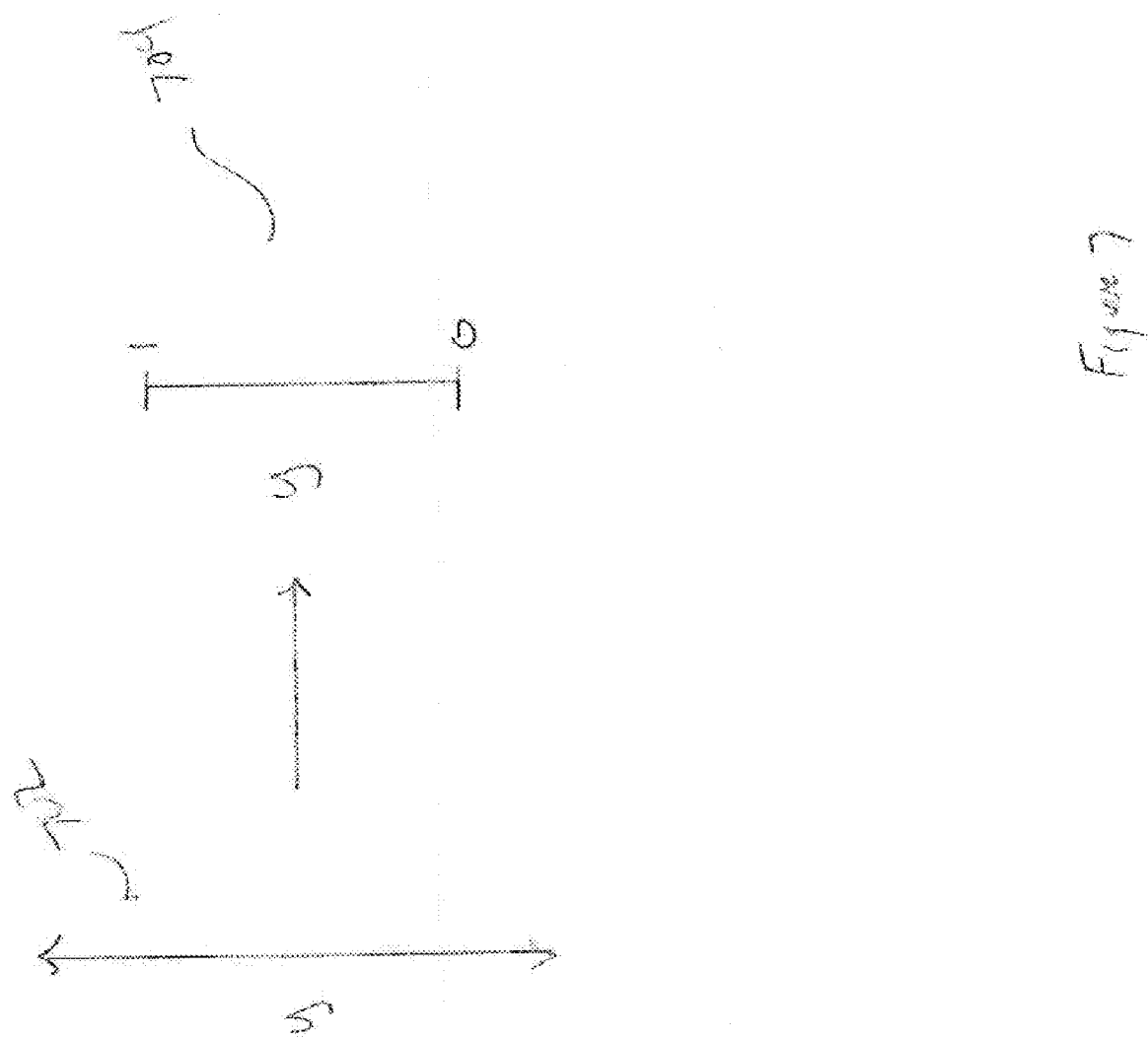

$$y(z) = \frac{1}{1+e^{-z}}$$

where $z = b_0 + b_1 x_1 + b_2 x_2 + \cdots + b_p x_p$

SYSTEM AND METHOD FOR CONSTRUCTING FORECAST MODELS

TECHNICAL FIELD

The present invention is related to computational forecasting methods and systems and, in particular, to a method and system that employs generalized logistic regression to generate forecast models.

BACKGROUND OF THE INVENTION

Computational forecasting systems are important and widely used tools in finance, business, commerce, governmental agencies, research organizations, and other institutions. There are myriad different reasons why organizations need to predict, as accurately as possible, future trends and events. As one example, a construction firm may need to predict, well in advance of undertaking actual construction, future demand for new housing and commercial buildings in order to acquire necessary employees, find and acquire property, undertake necessary license applications, and arrange for acquisition of needed supplies and materials. Although undertaking such activities can be based on intuitive guesses with regard to general economic trends, such intuitive guesses are often inaccurate, leading to unnecessarily large supplies-and-materials inventories and overstaffing, when the guesses prove to have overestimated demand, and inefficient and expensive last-minute hiring and deal making, when the guesses have underestimated demand. In both cases, the expenses incurred by the construction company may significantly exceed optimal expenses that would have been obtained with accurate prediction of construction demand.

Many different types of forecasting systems and methods have been developed, over the years, including highly complex and sophisticated financial forecasting systems, business demand forecasting systems, and many other computational forecasting methods and systems. While current methods appear to have justified the expenses incurred in developing and purchasing them, there remains a great demand in many of the above-mentioned types of organizations for new and different computational forecasting methods and systems.

BRIEF DESCRIPTION OF THE DRAWINGS

FIGS. 4A-C and 5 illustrate an example of a candidate-indicator-evaluation step according to one method embodiment of the present invention.

DETAILED DESCRIPTION OF THE INVENTION

Figure 1:
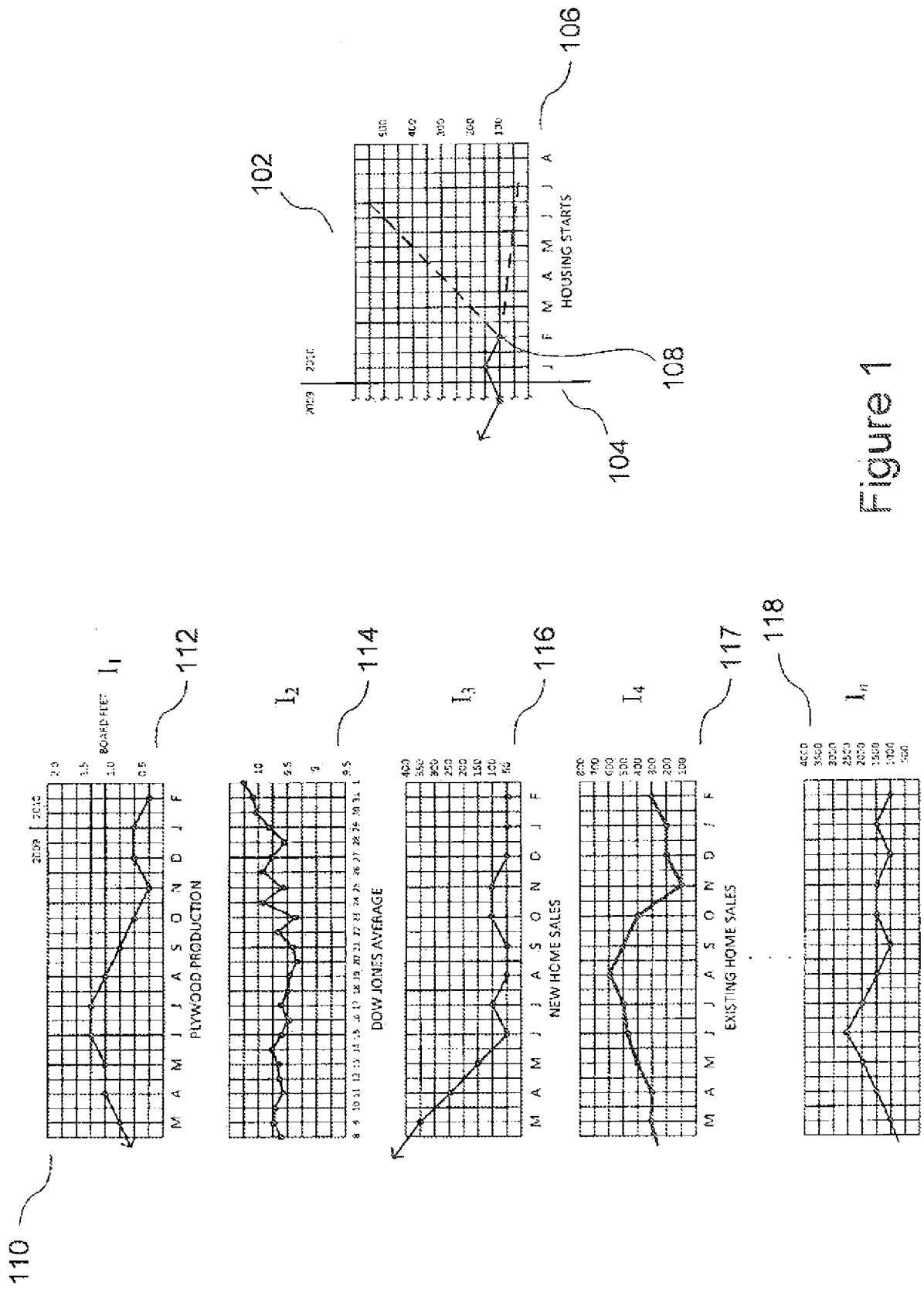
FIG. 1 illustrates an example problem addressed by method and system embodiments of the present invention.

FIG. 1 illustrates an example problem addressed by method and system embodiments of the present invention. In the example illustrated in FIG. 1, and discussed below, a construction company wishes to predict the number of housing starts during the next six months, in order to acquire the necessary staff and employees and arrange for acquisition of needed materials, supplies, and services in a timely fashion. In this example, the number of housing starts represents a variable of interest that is to be predicted on a monthly basis. According to system and method embodiments of the present invention, number of housing starts is considered a dependant variable for which a predictive model needs to be computationally derived. In FIG. 1, the data for housing starts accessible to the housing company is shown in graph 102. The numbers of new housing projects started each month, for a geographical region of interest, are plotted with respect to the vertical axis 104, and time is plotted with respect to the horizontal axis 106. The construction company has historical data for preceding months up to February 108 of the current year, but needs to predict the number of housing starts for each successive month through August of the current year.

Also available to the information and technology services department of the construction company are a variety of additional data, referred to as "indicators" in the current discussion, on which a prediction of housing starts may be based. These are shown as a column of graphs 110 on the left-hand side of FIG. 1. The amount of plywood produced during each month is a first indicator 112, designated "$I_1$." The Dow-Jones stock-market average, computed at the end of each trading day, is second indicator 114 designated "$I_2$." Additional potential indicators $I_3$-$I_n$ 116-118 include the number of new homes sold in the geographical region of interest, the number of existing homes sold in the geographical region of interest, and the number of new unemployment claims within the geographical region of interest. There may be many additional possible indicators of varying potential utility. The task addressed by method and system embodiments of the present invention is to use the available indicators, such as those shown in FIG. 1, to predict the housing starts for the next six months.

The example discussed with reference to FIG. 1 is but one example of myriad different prediction and forecasting problems that may be encountered in the various types of organizations mentioned above. Method and system embodiments of the present invention are general, and can be applied to a very large number of such predicting and forecasting problems. Estimation of housing starts is used, in the current discussion, as a convenient example to serve as a context for discussing the present invention.

Figure 2:
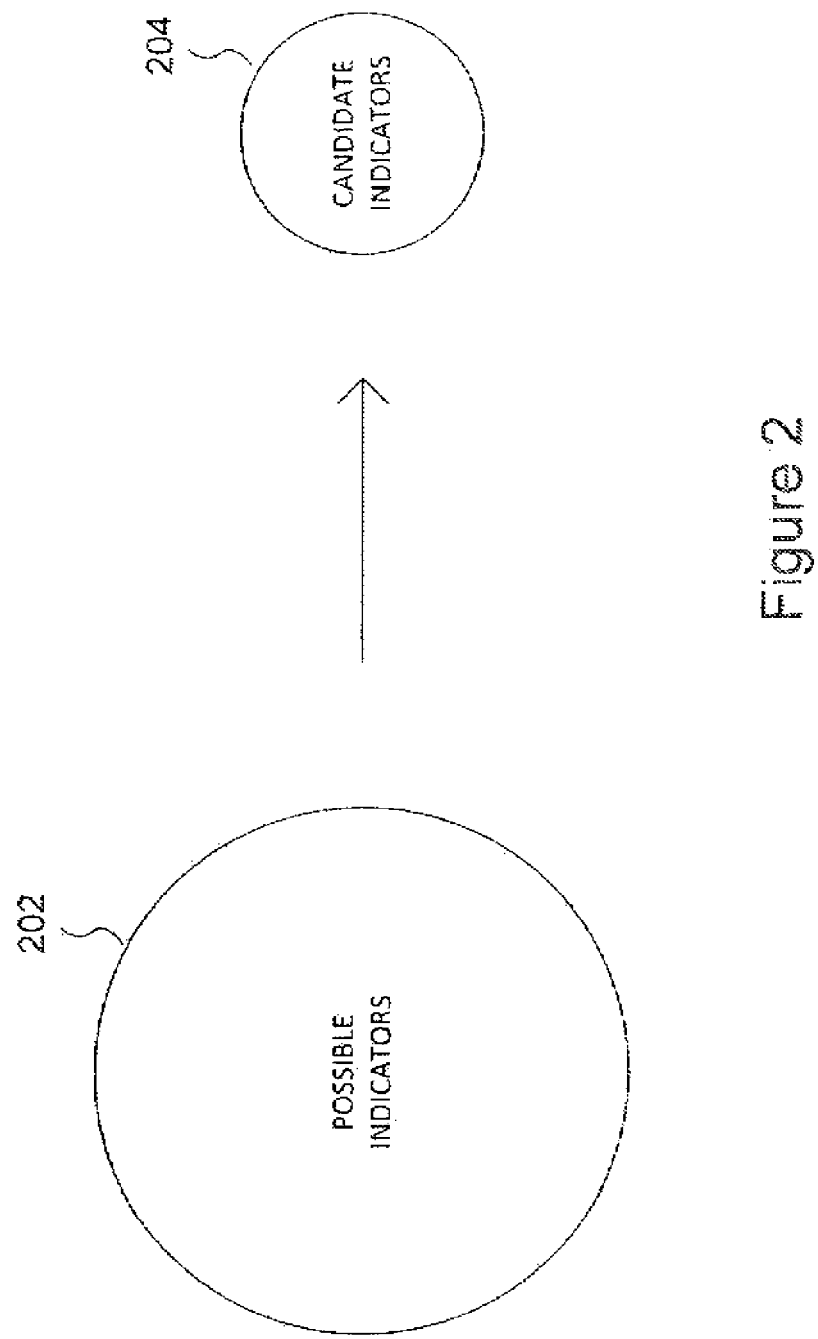
FIG. 2 illustrates an example of one of the initial steps undertaken by certain method embodiments of the present invention.

FIG. 2 illustrates an example of one of the initial steps undertaken by certain method embodiments of the present invention. All of the possible indicators that may be used to generate a model predicting a dependent variable of interest, such as housing starts, in the current example, are represented by a large disk 202. In an initial step, a set of candidate indicators is selected from all of these possible indicators, represented by disk 204. Selection of candidate indicators may be undertaken by one or more human analysts, based on knowledge of the problem domain, scientific, technical, and/or business intuition, and existing research results and literature in the problem domain, and a set of candidate results provided to the computational forecast-model-construction system of the present invention as input. In other cases, the selection of candidate indicators may be carried out by an automated indicator-selection component of a system embodiment of the present invention that applies selection rule to data for potential indicators accessible from a computer system, including data for potential indicators accessible from the Internet and various on-line databases.

Figure 3:
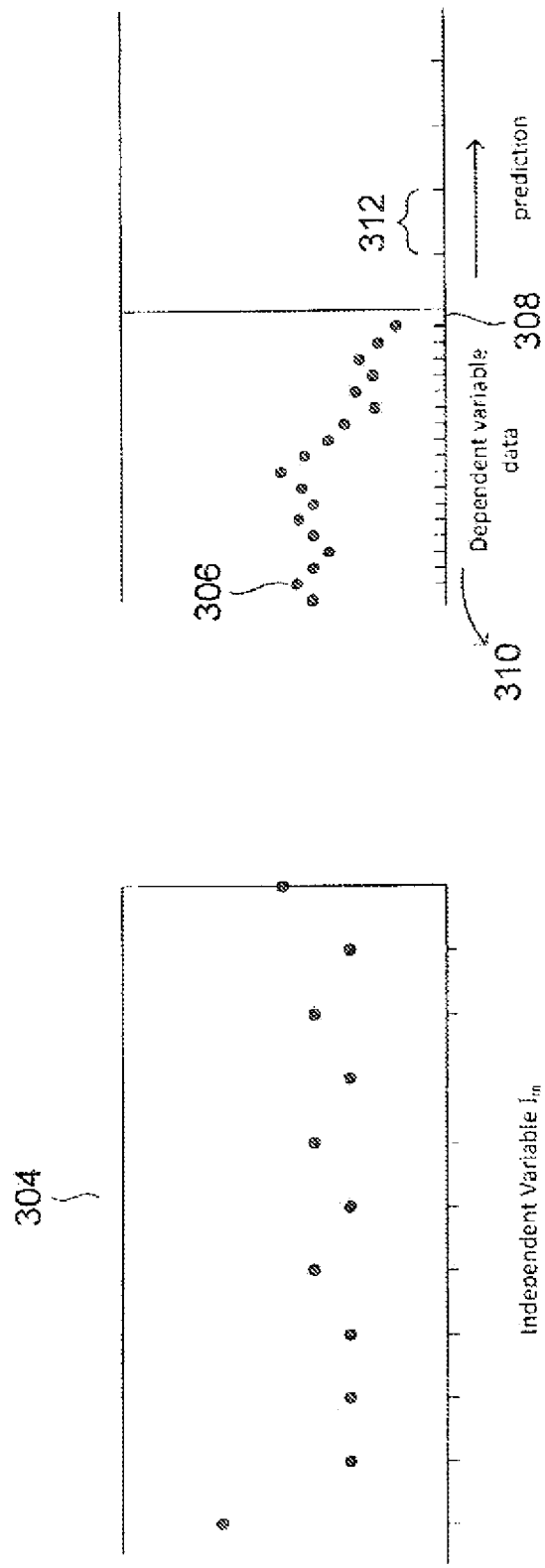
FIG. 3 illustrates an example of another of the initial steps undertaken by certain method embodiments of the present invention.

FIG. 3 illustrates an example of another of the initial steps undertaken by certain method embodiments of the present invention. In FIG. 3, a portion of the available historical data for the variable of interest is illustrated on a right-hand graph 302, and historical data variable for a first, candidate indicator, or independent variable, $I_m$, is shown in the left-hand graph 304. Historical data for the variable of interest may be available at a different sampling granularity than the desired granularity for prediction. For example, in the right-hand graph of FIG. 302, the historical data is represented by points, such as point 306, for each week stretching back from the present time 308 into the past 310. However, according to parameters supplied for forecast-model construction, it is desired to predict values for the variable of interest on a monthly basis, represented by the longer increments, such as increment 312, on the right-hand portion of the horizontal axis to the right of the current time 308. The data for the candidate indicator $I_m$, shown in graph 304, happens to coincide with the desired prediction granularity, in the case shown in FIG. 3. Were it not to coincide with the desired prediction granularity, then suitable data points may be obtained from the historical data for the candidate indicator by interpolation by various curve-fitting or numerical techniques, when the available data has lower sampling granularity, or by aggregation, averaging or smoothing techniques, in the case that the available data has a finer sampling granularity than the desired prediction granularity. In addition, when the historical data is incomplete, values for missing data may be estimated by interpolation or autoregression from the existing historical data, in certain cases, by estimation from trends observed in historical data for other candidate indicators, or by a combination of these approaches.

Additional candidate indicators may be derived from an initial set of candidate indicators. For example, in the home-starts-estimation problem domain, additional candidate indicators may be derived from an initial set of candidate indicators by: (1) computing a ratio of two initial candidate indicators, such as a ratio of new home sales divided by existing home sales; (2) normalizing an initial candidate indicator with respect to a computed value, such as, for example, deriving a normalized new-home-sales value by dividing new home sales by the sum of new and existing home sales; (3) computing delta differences, such as differences between new homes sales in a current month and new home sales in the previous month; and (4) many additional types of derived candidate indicators.

Figure 4C:
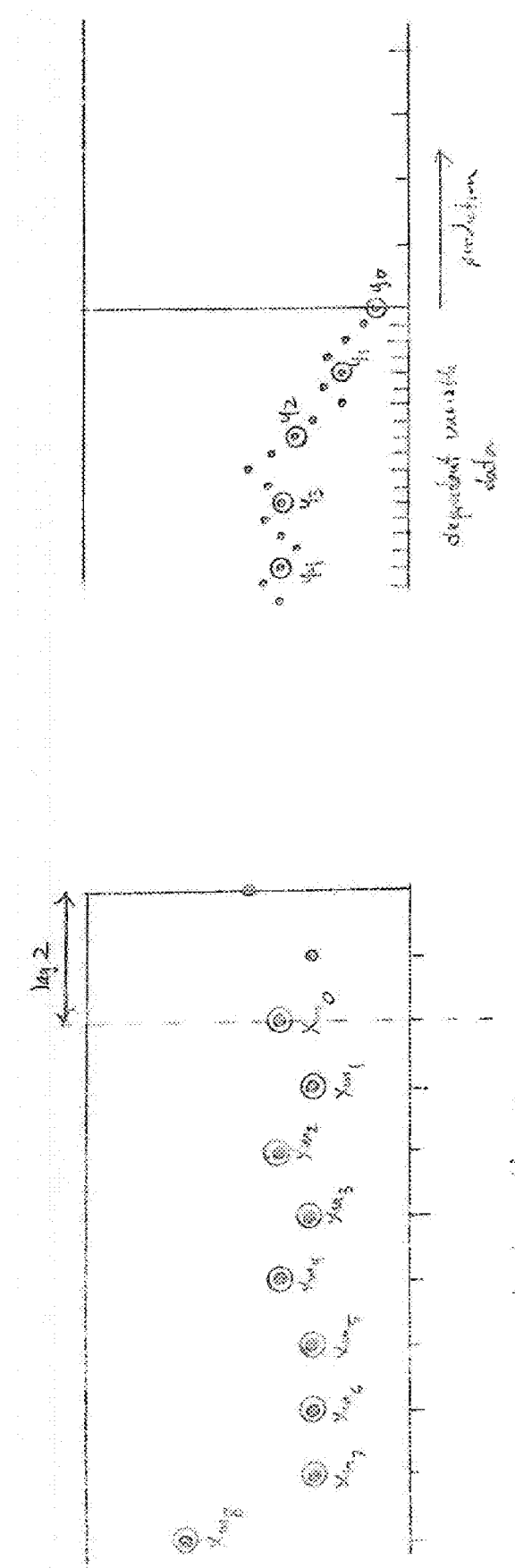
Figure 4A:
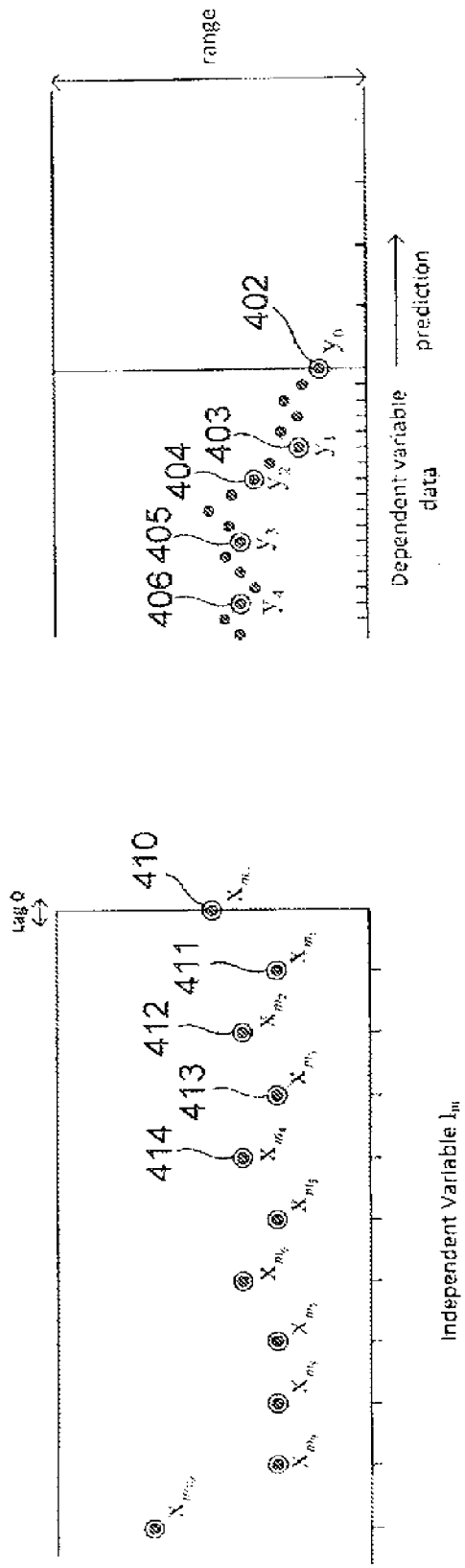

FIGS. 4A-5 illustrate an example of a candidate-indicator-evaluation step according to one method embodiment of the present invention. For each candidate indicator, $I_m$, where m ranges from 1 to the number of selected candidate indicators, the technique illustrated in FIGS. 4A-5 is employed to provide data for evaluating the candidate indicator. First, as shown in FIG. 4A, points from the historical data for the variable of interest 402-406, which correspond to data points for the historical data for the candidate independent variable, or indicator 410-414 are selected as two corresponding sets of data, $y_0, y_1, \ldots, y_n$ and $x_0, x_1, \ldots, x_n$, which may be compactly referred to as the vectors Y and X. Note that the selected points, FIG. 4A, are exactly in phase, with respect to time, so that $y_0$ 402 occurs at the same point in time as $x_0$ 410. Then, for these two initial data sets, various different correlation coefficients or metrics can be computed. These may include:

(1) the Pearson product-moment correlation coefficient for random variables X and Y, upon which a probability distribution, such as joint correlated Gaussian distribution, is first empirically derived from the observed data and then Pearson product-moment correlation coefficient is obtained as:

$$\rho_{X,Y} = \frac{\text{cov}(X, Y)}{\sigma_X \sigma_Y} = \frac{E((X - \mu_X)(Y - \mu_Y))}{\sigma_X \sigma_Y}$$

(2) the Pearson correlation coefficient:

$$r_{xy} = \frac{\sum (x_i - \bar{x})(y_i - \bar{y})}{(n-1)s_X s_Y}$$

where
  $x_i$ and $y_i$ are samples taken from variables X and Y;
  $\bar{x}$ and $\bar{y}$ are sample means of X and Y; and
  $s_x$ and $s_y$ are standard deviations of the samples;
(3) a geometric correlation coefficient:

$$\cos\Theta = \frac{X \cdot Y}{\|X\| \|Y\|}$$

where X and Y are vectors of data samples;
or (4) the Spearman's rank correlation coefficient $\rho$:

$$X \to X_R$$
$$Y \to Y_R$$
$$d_i = X_{R_i} - Y_{R_i}$$
$$\rho = 1 - \frac{6 \sum d_i^2}{n(n^2 - 1)}$$

where $X_R$ and $Y_R$ are rank vectors, for example:

$$\begin{bmatrix} 13 \\ 2 \\ 16 \\ 8 \\ 1 \\ 3 \\ 4 \end{bmatrix}_X \to \begin{bmatrix} 6 \\ 2 \\ 7 \\ 5 \\ 1 \\ 3 \\ 4 \end{bmatrix}_{X_R}$$

The various different types of correlation coefficients and metrics may be suitable for various different types of data, with the Spearman's rank correlation coefficient being the most generally applicable correlation coefficient. Many other correlation coefficients can be devised and used in order to determine the probable correlation between the indicator data set X and the dependent-variable data set Y. Note the number of data points n in each sample set X and Y may depend on the availability of historical data, may be a parameter for the method, or may involve both parametric specification and consideration of data availability. Truncation of at least one of the variable sets may be necessary when the two observation sets have different lengths.

Figure 4B:
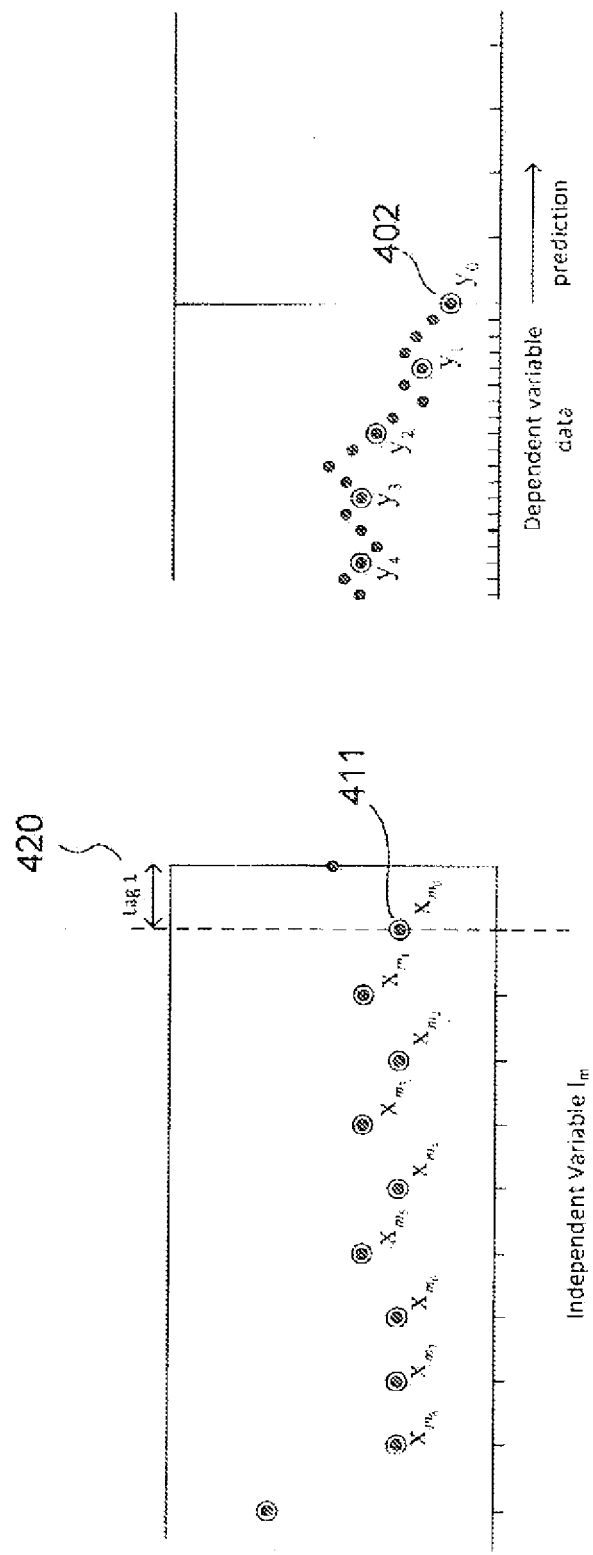
Figure 4C:
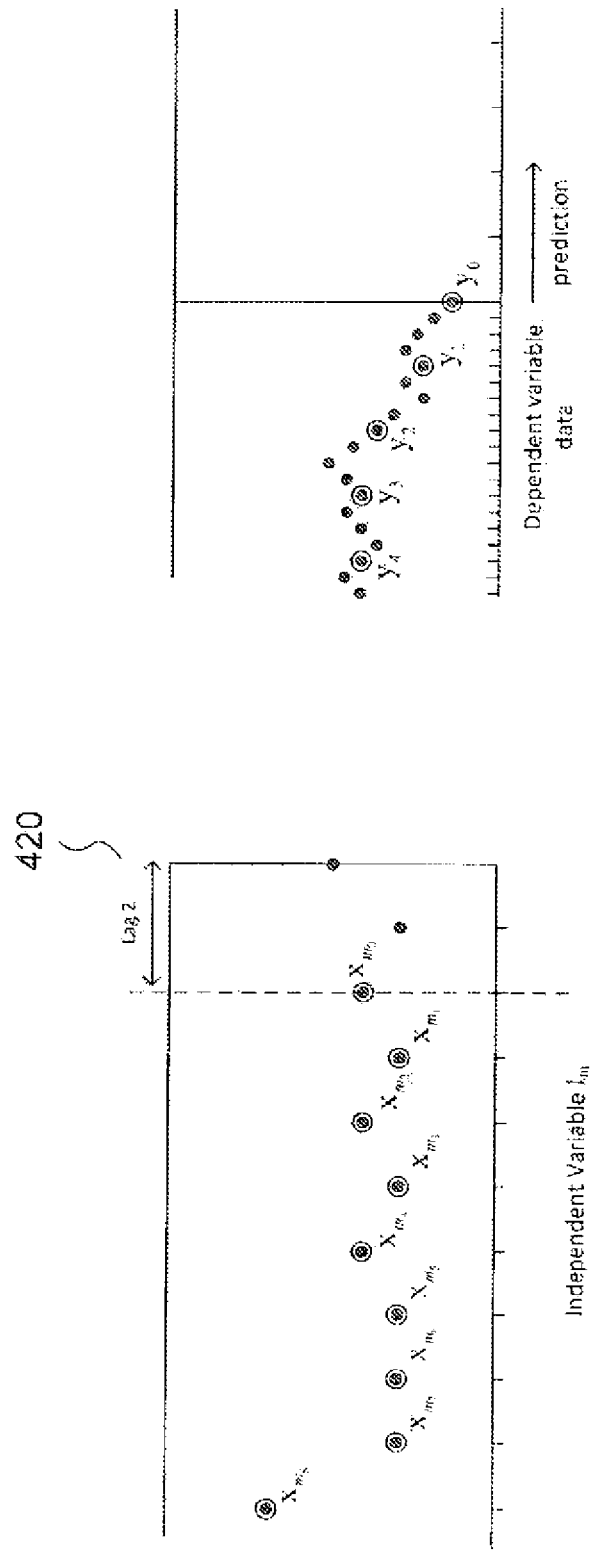

In the data-set selection illustrated in FIG. 4A, there is no lag between the indicator data set X and the variable-of-interest data set Y. Next, as shown in FIG. 4B, new data sets are chosen such that there is a time lag, or phase difference, 420 between the two data sets. Thus, in the case shown in FIG. 4B, $y_0$ 402 corresponds, in time, to the second-most recent indicator data point 411, now referred to as "$x_0$," and all subsequent data-point correspondences feature the same one-unit lag. A correlation coefficient is computed for these data sets. Then, as shown in FIG. 4C, the lag is increased to 2, producing a further phase-shifted pair of data sets, and a correlation coefficient is produced for these data sets. This process may continue to generate correlation metrics for data sets of varying lag times up to a maximum lag time, predetermined to be either optimal or a practical maximum value for model construction, or provided as a parameter to a method or system embodiment of the present invention.

Finally, as shown in FIG. 5, a lag is selected for each candidate indicator. In FIG. 5, correlations for an indicator data set and the variable-of-interest data set, generated by the method discussed with reference to FIGS. 4A-C, are plotted with respect to a vertical axis 502 corresponding to correlation-coefficient magnitude and a horizontal axis 504 corresponding to the lags. In the case shown in FIG. 5, the correlation/lag point 510 represents the maximum correlation found, by the method of FIGS. 4A-C, for the candidate indicator $I_m$, which occurs with lag 512. Each indicator is therefore transformed into a lagged indicator with a correlation to the variable of interest, with the correlation and lag corresponding to the maximum correlation for all lagged data sets and the lag corresponding to the lag time of the maximally correlated, time-shifted data set. From these lagged candidate indicators, a set of independent variables for model construction is selected. The selection may be used on various criteria, but generally includes selecting the most highly correlated candidate indicators with lag times within an acceptable range of lag times for the problem at hand.

It should be noted that lag times may not be computed and evaluating in an ascending sequence of lag times, but may be evaluated for a candidate indicator according to an arbitrary sequence or set, such as, for example, the set {1, 3, 12, 48}, where the lag times have units of months. Such sequences or sets can be randomly selected, in certain cases, can be predetermined sequences or patterns, or selected by a combination of techniques, and different sequences or sets may be used for different candidate indicators. In addition, just as the initial list of candidate indicators may be supplemented by adding derived candidate indicators, the current set of candidate indicators may be additionally supplemented by using more than one lag time for one or more of the current candidate indicators. In other words, a set of independent variables can be considered to be a set of candidate-indicator/lag-time pairs, in which a particular candidate indicator may occur multiple times with different lag times.

Figure 6:
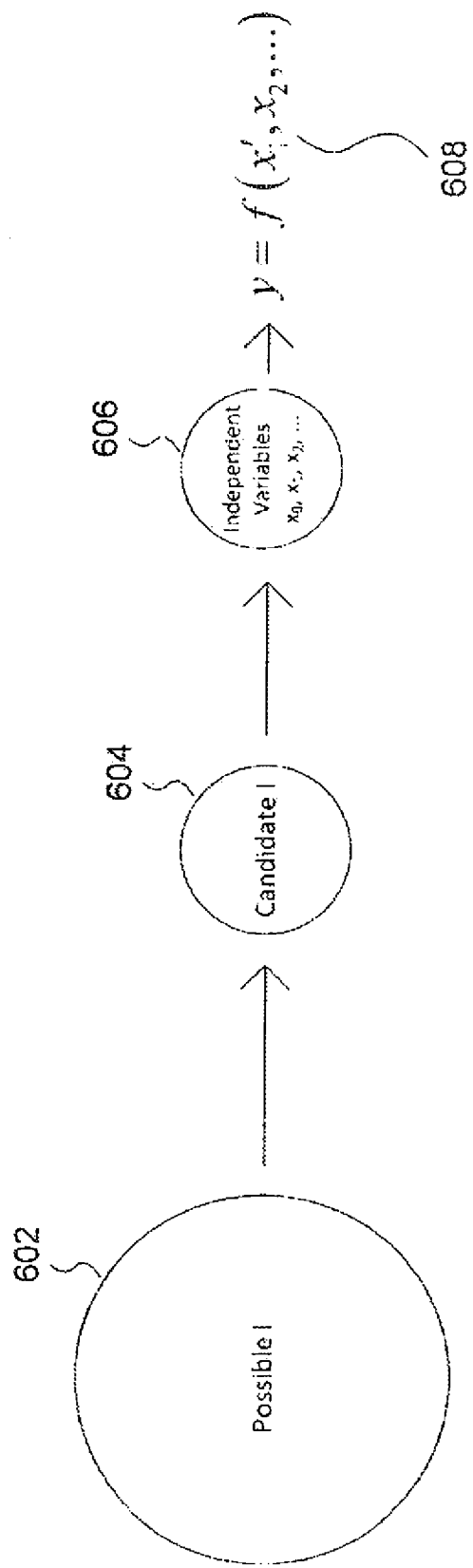
FIG. 6 summarizes an example of initial steps undertaken by one method embodiment of the present invention.

FIG. 6 summarizes an example of initial steps undertaken by one method embodiment of the present invention. As discussed above, the possible indicators 602 serve as a pool from which a set of candidate indicators 604 is selected. Correlation coefficients and lag times are computed for each of the candidate variables, as discussed above with reference to FIGS. 4A-5, and a set of independent variables for model construction 606 is selected from these candidate indicators. Note that, in the subsequent discussion, independent variables are denoted $x_1, x_2, \ldots, x_p$. Using the selected independent variables, initial models 608 may constructed for the variable of interest, denoted y:

$$y=f(x_1,x_2,\ldots,x_p)$$

In certain embodiments of the present invention, linear models are constructed:

$$y_i=\alpha_1 x_1 + \ldots \alpha_p x_p + \epsilon_i$$

The $\epsilon_i$, in the above equation represents an error or noise term, which is minimized in any of the various linear-regression techniques employed to determine best coefficients $\alpha_1, \alpha_2, \ldots, \alpha_p$. Expressed in vector notation, the model becomes:

$$Y=X\alpha+\epsilon$$

where $\alpha$ is a vector of coefficients and $\epsilon$ is a vector of error, or noise terms. Common methods employed to compute coefficients for the linear model include least squares:

$$\hat{\alpha}=(X^T X)^{-1} X^T Y$$

weighted least squares:

$$\hat{\alpha}=(X^T W X)^{-1} X^T Y$$

and least absolute difference:

$$\hat{\alpha} = \min_{\hat{\alpha}} \left( S = \sum_{i=1}^{n} |y_i - f(x_1, x_2, \ldots, x_p)| \right).$$

The initial models may be used to evaluate various subsets of the independent variables for use in building forecast models. In other words, evaluation of initial linear models constructed for various subsets of the independent variables may be used to select one or more subsets of the independent variables for use in constructing one or more forecast models.

Figure 7:
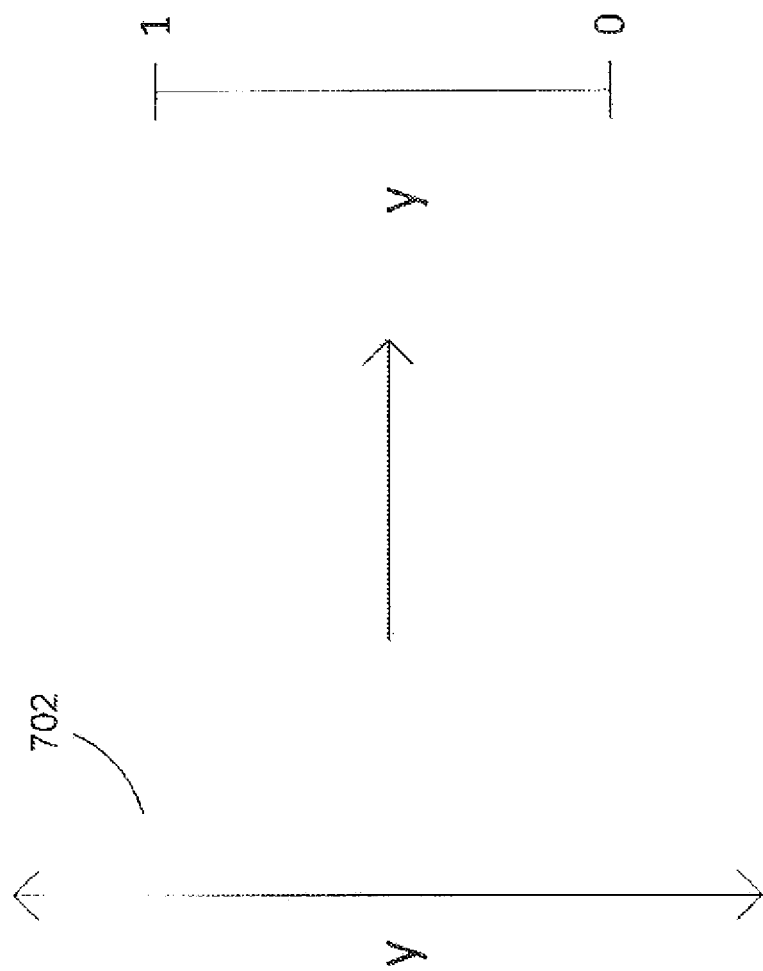
FIG. 7 illustrates an example of a range-adjusting step employed in various method and system embodiments of the present invention.
Figure 8:
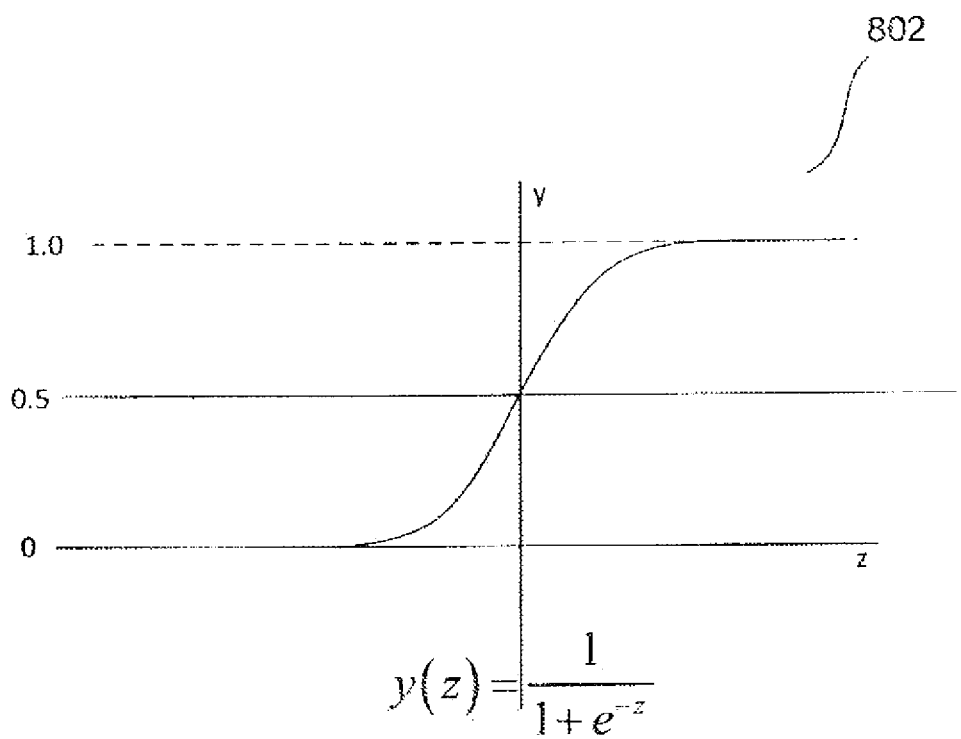
Figure 9:
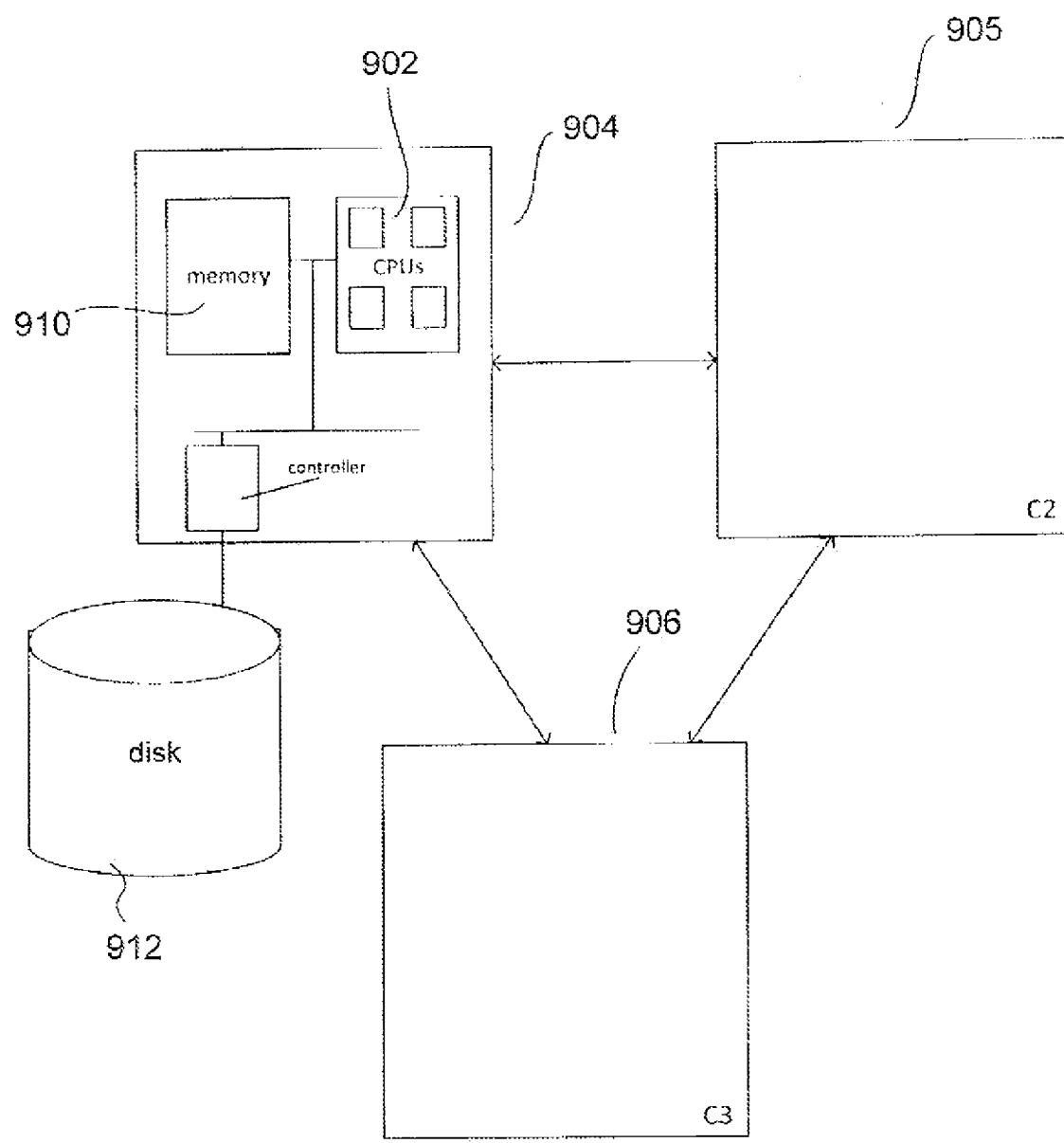

FIG. 7 illustrates an example of a range-adjusting step employed in various method and system embodiments of the present invention. The variable of interest is transformed from its initial range 702 to a range of [0,1] 704. For example, in the housing-start estimation problem discussed with respect to FIG. 1, new housing starts may range from 0 to 600. However, in the transformation step, the variable of interest is transformed to be a real number that ranges from 0.0 to 1.0, represented as "[0,1]." For example, for the new housing starts variable, a transformed-variable value of 1.0 represents 600 housing starts, a transformed-variable value of 0.5 representing 300 housing starts, and so forth.

Figure 8:
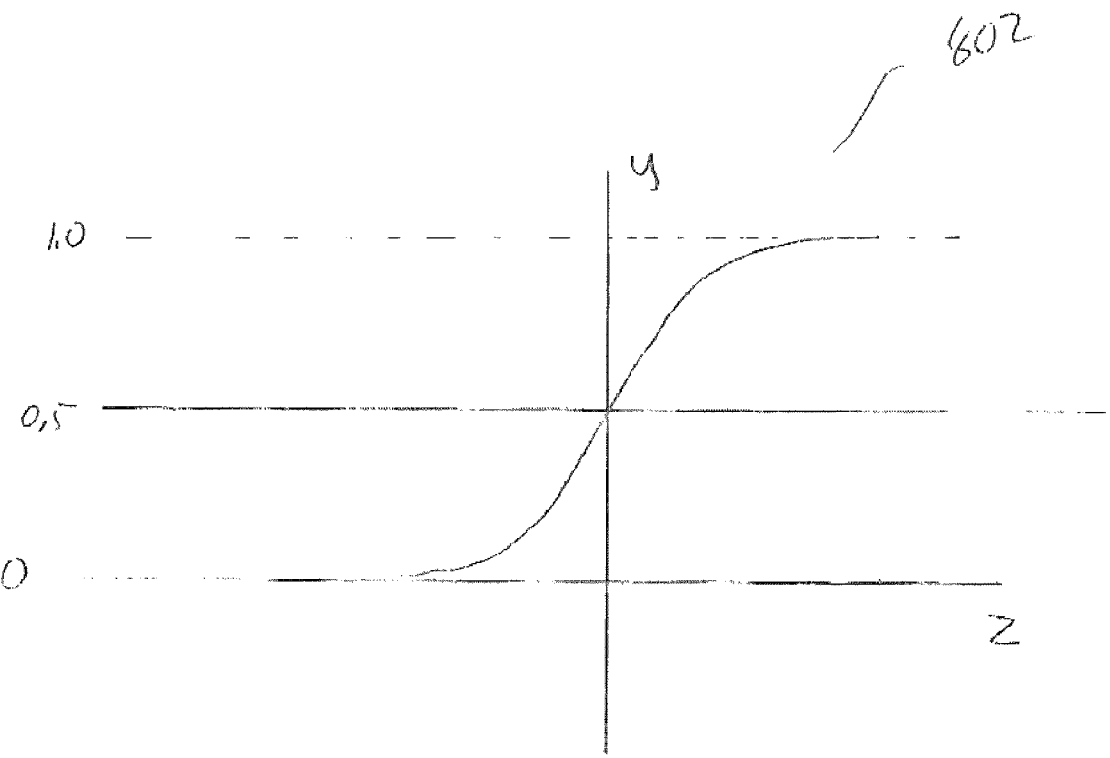
FIG. 8 illustrates an example of logistic regression in various method and system embodiments of the present invention.

Next, a new model is computed for the variable of interest using logistic regression. FIG. 8 illustrates an example of logistic regression in various method and system embodiments of the present invention. In logistic regression, data is fitted to the model:

$$y(z) = \frac{1}{1+e^{-z}}$$

where $z=\beta_0+\beta_1 x_1+\beta_2 x_2+ \ldots +\beta_p x_p$ as shown in graph 802 in FIG. 8. The values generated by this model can be seen, in the graph 802 shown in FIG. 8, to range from 0 to 1, which corresponds to the transformed variable of interest. The variable z is a sum of the independent variables multiplied by suitable coefficients. Thus, following logistic regression, a forecast model of the following form is obtained. The model y(z) can then be used to predict or estimate values for the dependent variable, with the value returned by the model y(z) resealed or inversely transformed from the range [0,1] back to the natural range for the variable of interest.

Figure 9:
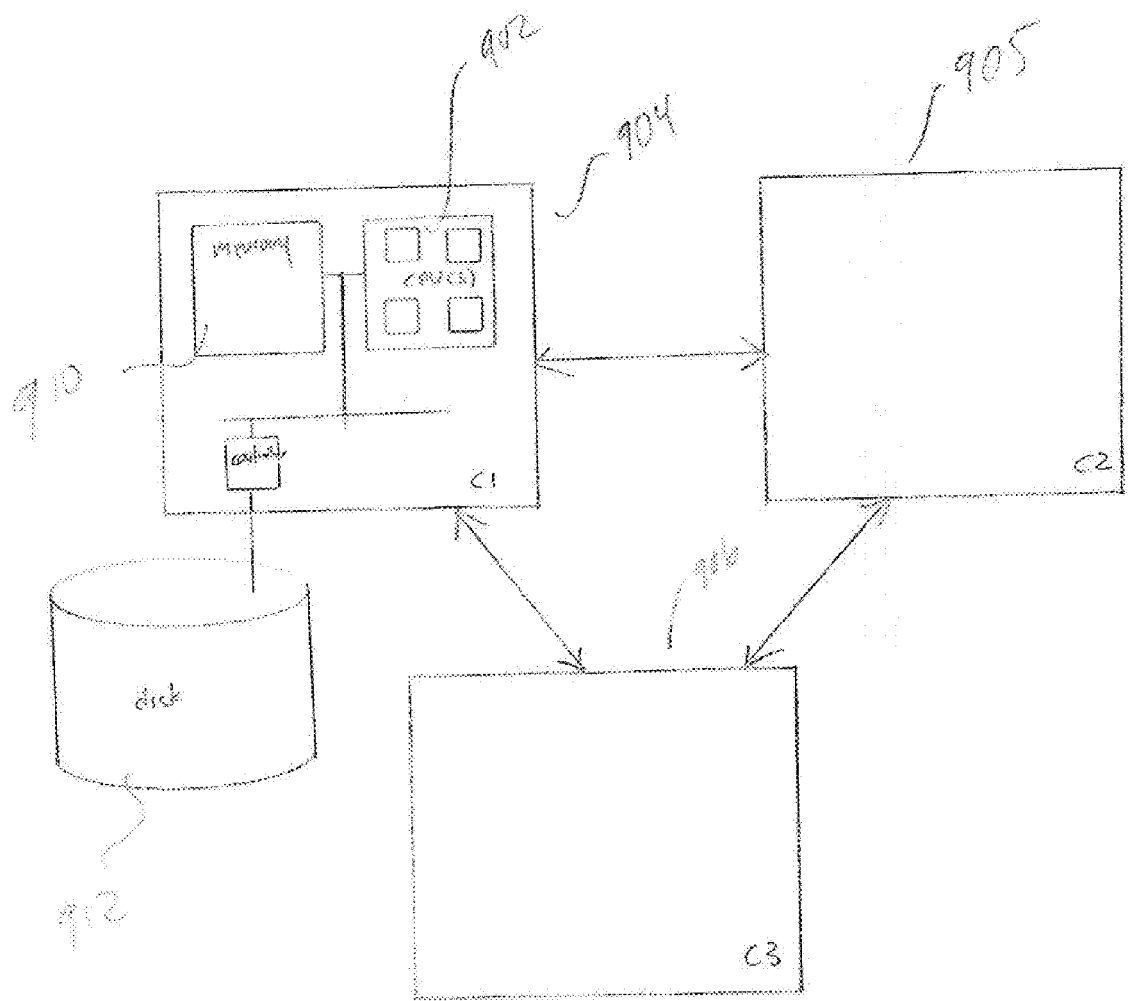
FIG. 9 illustrates an example of a computational environment within which embodiments of the present invention, implemented as software programs, are executed, and which comprises a computational forecasting system according to the present invention.

FIG. 9 illustrates an example of a computational environment within which embodiments of the present invention, implemented as software programs, are executed, and which comprises a computational forecasting system according to the present invention. The implementation of the method embodiments of the present invention may run on one or more central-processing units ("CPUs") 902 within one or more computer systems 904-906 that include memory 910 and mass storage devices 912. The one or more CPUs can access data stored on computer-readable media, including ferromagnetic and optical disks, magnetic tape, and various types of electronic memories.

Figure 10A:
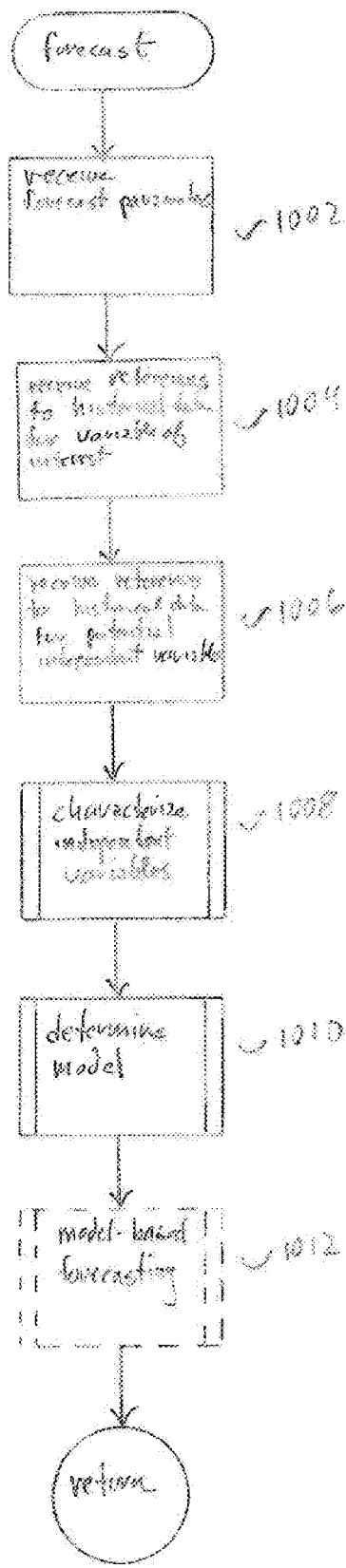
FIGS. 10A-D provide example control-flow diagrams for a forecasting method, discussed above, that represents one embodiment of the present invention.

FIGS. 10A-D provide example control-flow diagrams for a forecasting method, discussed above, that represents one embodiment of the present invention. FIG. 10A provides a control-flow diagram for a highest-level routine "forecast." In step 1002, various forecast-problem parameters are received, such as the identity of the variable of interest, sequences or sets of lag times to evaluate for candidate indicators, thresholds for model fitness, a maximum number of iterations, and other such forecast parameters. In step 1004, historical data, or references to historical data, for the variable of interest, is received. In step 1006, sources of possible indicators and historical data for those indicators, or references to the possible indicators and historical data, are received. As discussed above, the potential indicators and historical information associated with them can be obtained by automated indicator-searching routines, in certain embodiments of the present invention, or, in alternative embodiments of the present invention, may be provided by input from human analysts. In step 1008, the routine "characterize independent variables" is called. This routine computes correlation coefficients and lag times for the possible indicators, and, as discussed above, may supplement the possible indicators with additional possible indicators derived from those received in step 1004. In step 1010, logistic regression is employed to obtain a model for the variable of interest. In optional step 1012, the model obtained in step 1010 is employed to forecast values for the variable of interest at various points in time of interest.

Figure 10C:
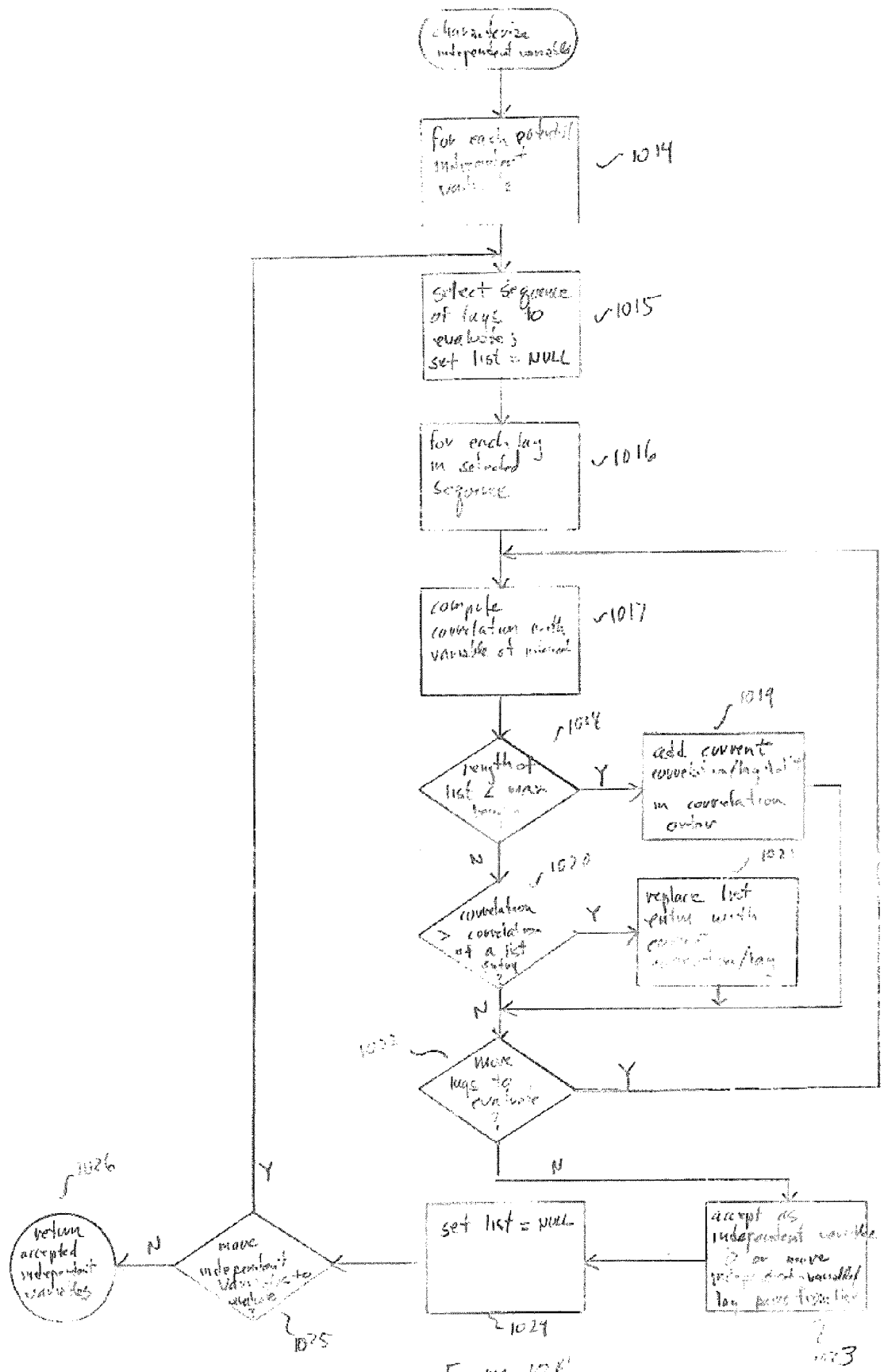
Figure 10C:
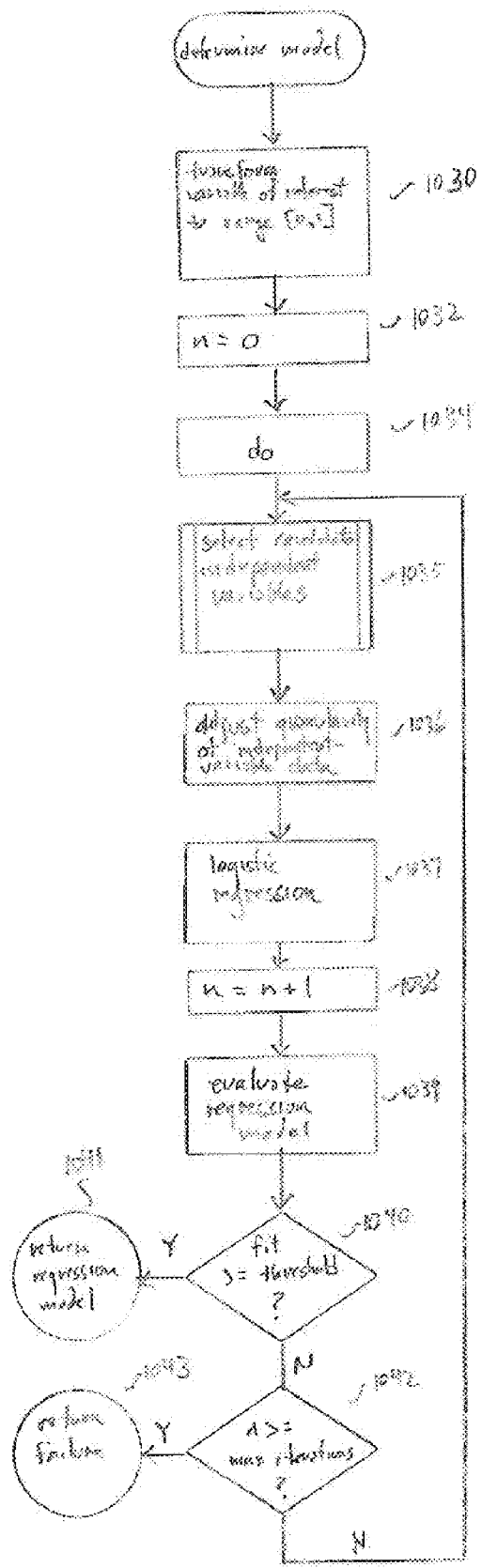
Figure 10D:
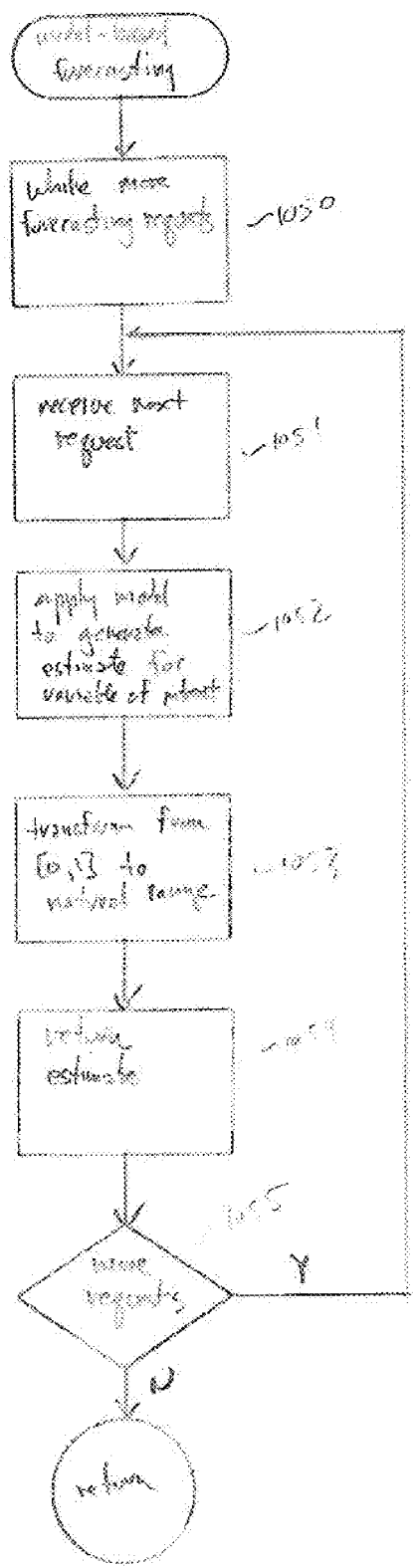
Figure 10A:
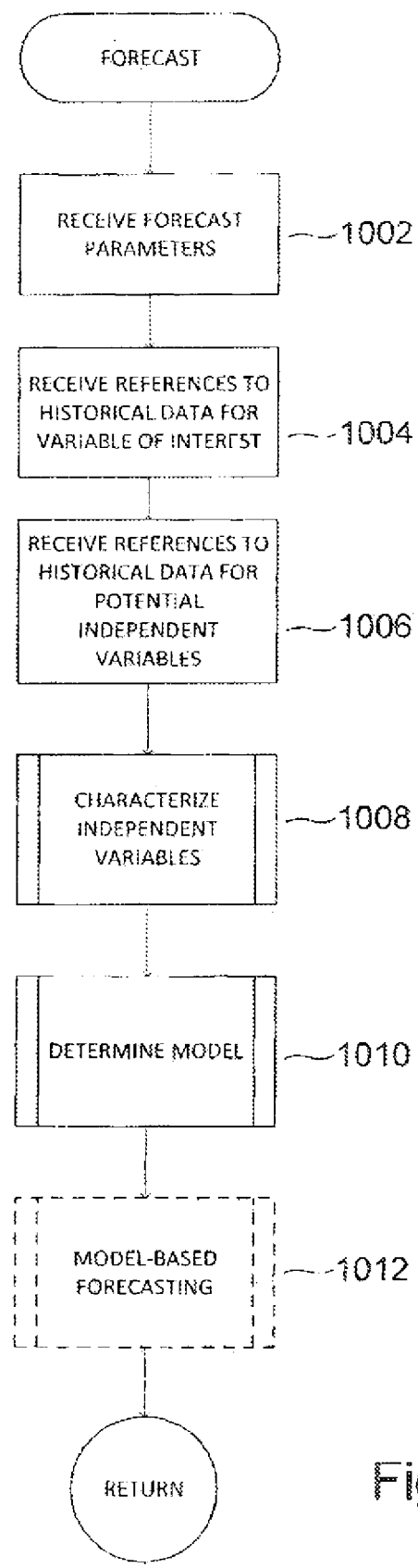
Figure 10B:
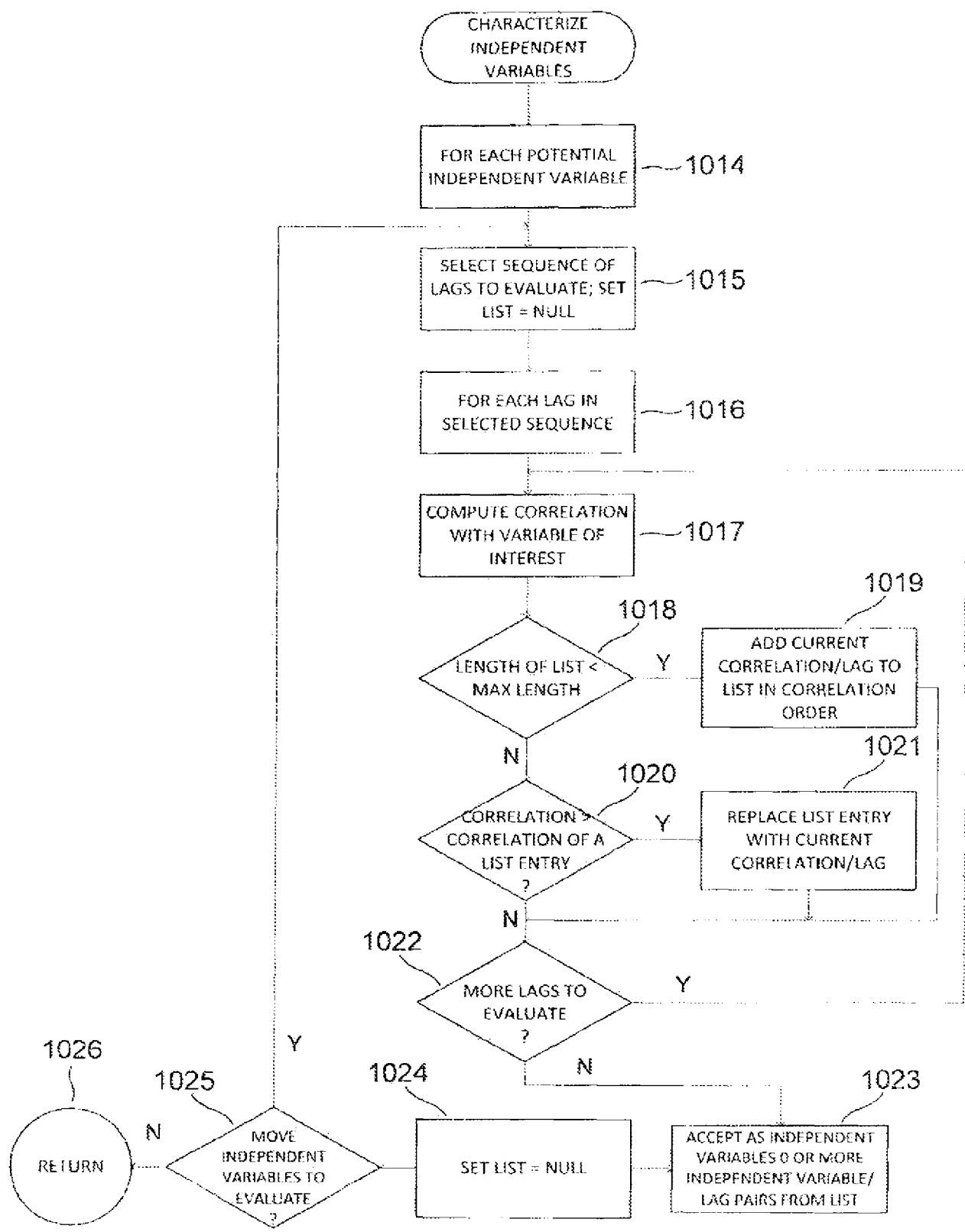
Figure 10C:
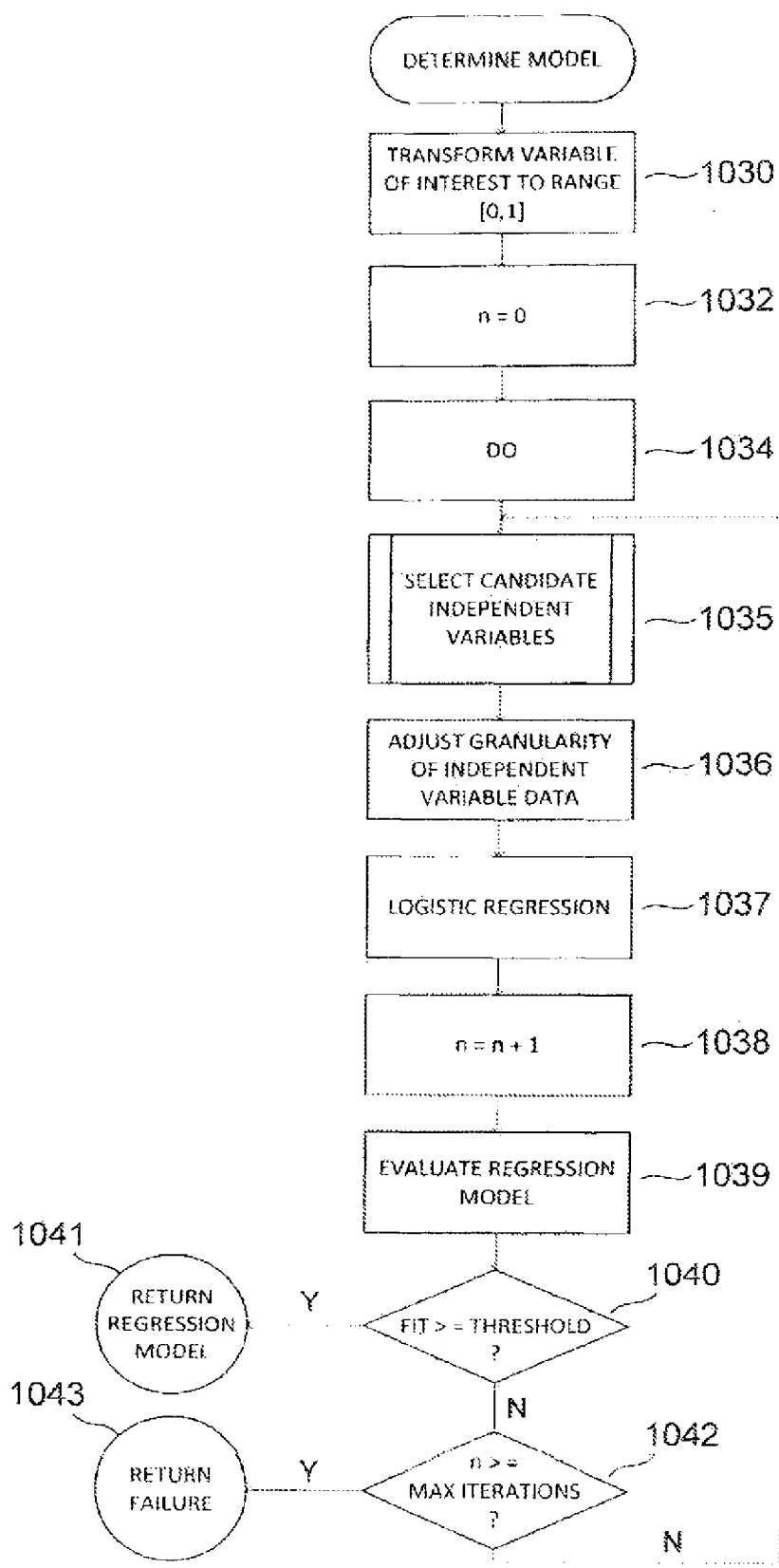
Figure 10D:
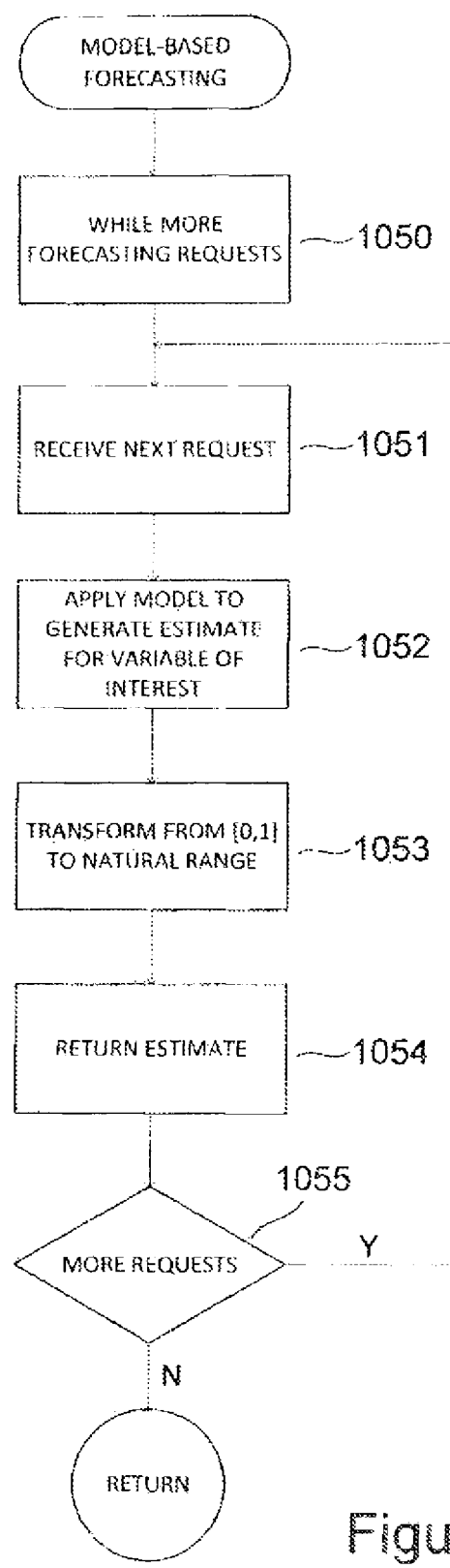

FIG. 10B provides a control-flow diagram for the routine "characterize independent variable," called in step 1008 of FIG. 10A, that is used in one embodiment of the present invention. In the outer for-loop of steps 1014-1026, each potential independent variable is considered. These include the potential independent variables, indications of which are received in step 1006 of FIG. 10A. In addition, as discussed above, a variety of potential independent variables derived from the initially received potential independent variables are considered. For the currently considered potential independent variable, a sequence of lag times to evaluate is selected, in step 1015, and a list of lag/correlation-coefficient pairs is initialized to contain no entries. As discussed, the sequence may be selected according to various strategies and criteria, including by random selection, and the sequence may not be ordered, may be partially ordered, or ordered in ascending or descending order. The selection may be specified, or partly specified, by forecast-problem parameters, may be computed from characteristics of the available historical data for the potential independent variable, may be fully or partially selected at random, or may be selected based on additional considerations or combinations of the previously mentioned considerations and/or additional considerations. In the inner for-loop of steps 101-1023, a correlation coefficient is computed for the currently-considered potential independent variable with respect to each lag in the sequence of lags selected in step 1016. In step 1017, a correlation coefficient for the currently considered potential independent variable and the currently considered lag is computed, as discussed above, using any of multiple possible correlation-coefficient-determination methods. The lag time and computed correlation coefficient are added to the list, in step 1019, when the list is not yet full, as determined in step 1018. Otherwise, when the list is full, but the correlation coefficient computed for the currently-considered lag is greater than the correlation coefficient of least magnitude in a lag/correlation-coefficient-pair list entry, as determined in step 1020, the lag/correlation-coefficient-pair list entry is replaced with the currently-considered lag and correlation coefficient, in step 1021. When there are more lags to evaluate, as determined in step 1022, then control flows back to step 1017. Otherwise, zero, one, or more independent-variable/lag pairs are accepted from the list as independent variables, in step 1023, and the list is reinitialized, in step 1024, for consideration of a subsequent potential independent variable. The selection may be based on a correlation-coefficient threshold, specified by a forecast-problem parameter, or based on other criteria. When there are more potential independent variables to evaluate, in the outer for-loop of steps 1014-1026, as determined in step 1025, then control flows back to step 1015. Otherwise, the accepted independent variables are returned, in step 1026.

In FIG. 10C, a control-flow diagram for the routine "determine model," called in step 1010 of FIG. 10A, is provided. In step 1030, the variable of interest is transformed from its natural range to the range [0,1]. In step 1032, local variable n is set to 0. In the loop of steps 1034-1043, a models are iteratively generated until a model that meets a threshold fit is obtained, as determined in step 1040, in which case the model is returned in step 1041, or until a maximum number of iterations has been carried out, as determined in step 1042, in which case a failure indication is returned, in step 1043. In step 1035, a next set of candidate independent variables are selected from the accepted independent variables, determined by the routine "characterize independent variables," shown in FIG. 10B. The selection of the next set of candidate independent variables may be specified, or partially specified, by forecast-problem parameters, may be made at random, or may be computed by various candidate-independent-variable selection methods, including constructing an initial linear model for possible sets of candidate independent variables and evaluating the initial linear model for the ability to predict historical dependent-variable data. In step 1036, the granularity of the independent-variable data is adjusted, as discussed above, for the problem-domain granularity, specified by forecast-problem parameters, and missing data may be interpolated or computed by autoregression or by using data associated with other independent variables. A next model is constructed, in step 1037, by logistic regression, as discussed above. The local variable n is incremented, in step 1038, and the regression model is evaluated, in step 1039. This evaluation may be accomplished by using historical data from one time period to predict historical data of another time period. In general, a score or metric may be computed to reflect the fitness of the model, based on such historical predictions. When the model has a fitness above a threshold fitness, as determined in step 1040, then the forecast method returns success and the currently computed model, which can then be used to predict future data points for the variable of interest. On the other hand, when the number of constructed models has not exceeded some maximum number of models, as determined in step 1042, then a new model may be generated by selecting a different set of candidate independent variables and/or by varying other parameters of the model-construction method. Otherwise, a failure is returned, indicating that a sufficient indicator-set basis for generating a forecast model was not provided, or that, in certain cases, historical data for the dependent variable indicates the sample values of the dependent variable to be randomly distributed or otherwise unsuitable for forecast models.

FIG. 10D provides a control-flow diagram for the routine "model-based forecasting," called in step 1012 of FIG. 10A. In the while-loop of steps 1050-1055, requests for dependent-variable prediction are received and model-based predictions are returned, until no further requests are received, as determined in step 1055. In step 1051, a next request is received, and, in step 1052, the model obtained by the routine "determine model" is used to predict or estimate one or more dependent variable values. The value returned by application of the model is transformed back to the natural range for the dependent variable, in step 1053, and the estimate returned to the requestor in step 1054. Requests may be received through a user interface, in real time, and responses provided to a user through the user interface. Alternatively, requests may comprise received files or messages, and responses may be returned in a similar fashion, or stored in electronic memory or mass-storage devices for subsequent access.

Although the present invention has been described in terms of particular embodiments, it is not intended that the invention be limited to these embodiments. Modifications will be apparent to those skilled in the art. For example, many alternative embodiments of the present invention can be obtained by varying any of many implementation parameters, including programming language, operating system platform, computer hardware platform, control structures, modular organization, data structures, and other such implementation parameters. Various types of regression methods may be employed to generate initial forecast models, and many different criteria may be employed for selecting candidate indicators and lagged independent variables.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

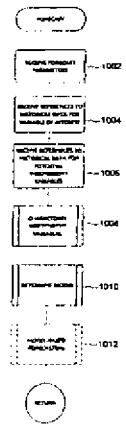

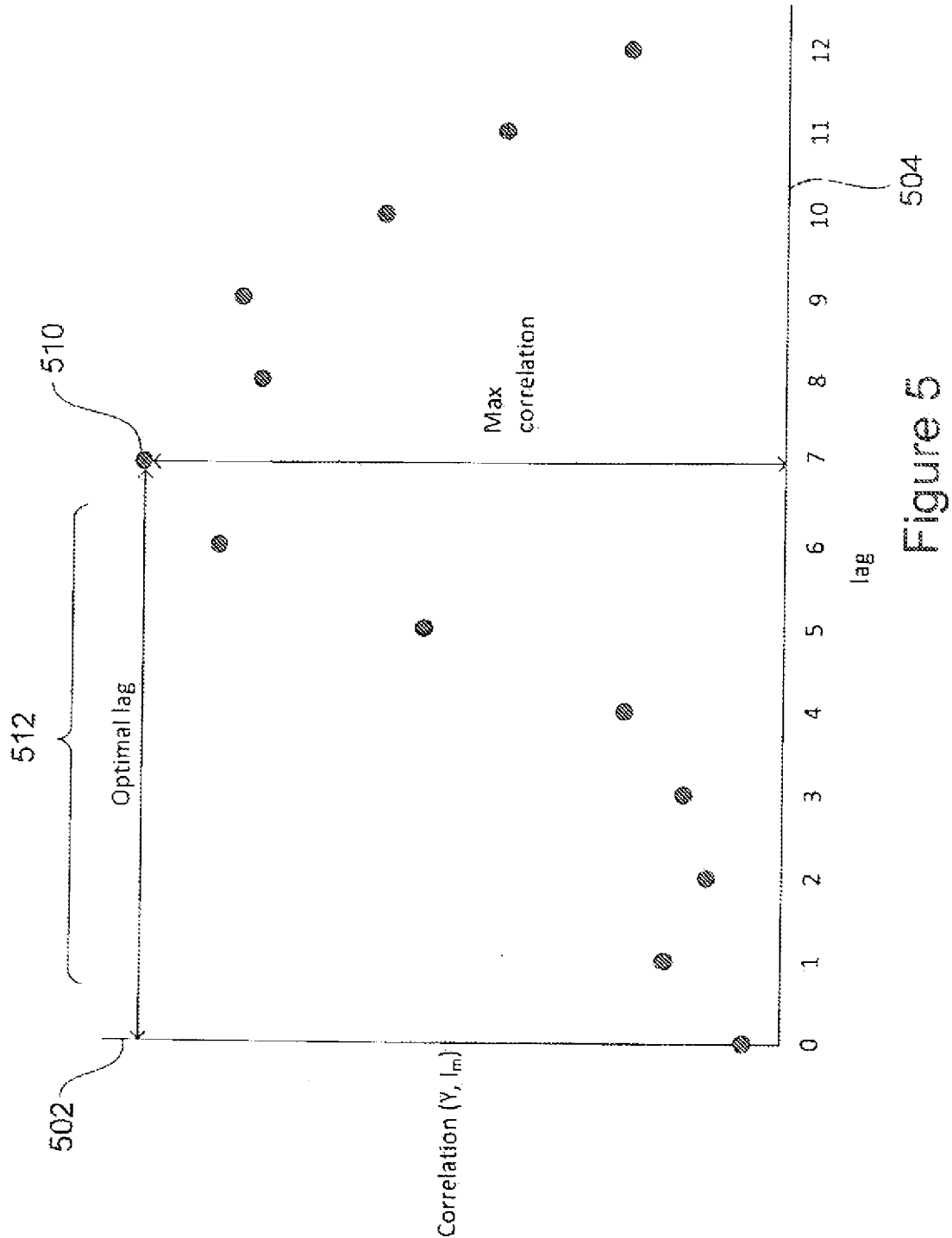

The invention claimed is:

1. A computational forecasting system, implemented as one or more electronic computers that execute one or more computer programs, the computational forecasting system comprising:
an identity of a dependent variable of interest and identities of a plurality of candidate indicators; stored in an electronic memory of the one or more electronic computers, along with historical data or stored references to historical data accessible to the computational forecasting system through electronic communications;
an independent-variable selection component that generates correlations to the dependent variable of interest and lag times for the candidate indicators, and uses the generated correlations and lag times to select a number of the candidate indicators as a set of independent variables that are stored in an electronic memory of the one or more electronic computers; and
a model-generation component that, using a regression method, generates forecast models for the dependent variable of interest until a model that meets an acceptance criterion or criteria is obtained and stored in an electronic memory of the one or more electronic computers.

2. The computational forecasting system of claim 1 wherein the independent-variable selection component selects a number of the candidate indicators as a set of independent variables by:
for each candidate indicator, for each currently considered lag time selected from a set of lag times, selecting data points from historical data for the candidate indicator shifted by the currently considered lag time with respect to data points selected from historical data for the dependent variable of interest, and computing a correlation between the selected, time-shifted data points from the historical data for the candidate indicator to the data points selected from historical data for the dependent variable of interest;
selecting as independent variables zero, one, or more lag times for which the computed correlation coefficient is greater or equal to a threshold value; and
storing, the selected lag, times and computed correlation coefficients in association with a reference to the candidate indicator in memory.

3. The computational forecasting system of claim 1 wherein the model-generation component generates forecast models for the dependent variable of interest until a model that meets an acceptance criterion or criteria is obtained by:
transforming the range of the dependent variable of interest to [0,1]; and
iteratively, selecting a next set of candidate independent variables;
carrying out regression on the candidate independent variables with respect to the dependent variable of interest to generate a next model; and
evaluating the next model until the most recently evaluated next model meets the acceptance criterion or criteria.

4. The computational forecasting system of claim 3 wherein logistic regression is used to generate the next model.

5. The computational forecasting system of claim 3 wherein selecting a next set of candidate independent variables further comprises:
selecting a number of sets of independent variables;
for each set of independent variables, constructing an initial model by linear regression;
evaluating each initial model to generate a fitness metric for the initial model; and
selecting as the next set of candidate independent variables the set of independent variables from which an initial model providing a best fitness metric was constructed.

6. The computational forecasting system of claim 1 further comprising:
a forecasting-model-evaluation component that uses historical data for the independent variables and a first set of historical data for the dependent variable of interest to predict a second set of historical data for the dependent variable of interest using a forecast model; and compares the predicted second set of historical data for the dependent variable of interest with a corresponding second set of historical data for the dependent variable of interest to determine a fitness metric for the forecast model.

7. The computational forecasting system of claim 6 further comprising:
a forecast-model-selection component that selects a forecast model, from a number of generated forecast models constructed from different sets of independent variables, based on the fitness metrics determined for the number of generated forecast models by the forecasting-model-evaluation component.

8. A computational forecasting method comprising:
receiving, by a computer system, forecast parameters, an identity of a variable of interest and references to electronically stored historical data for the variable of interest, and identities of potential independent variables and references to electronically stored historical data for the potential independent variables;
characterizing the potential independent variables, by the computer system, by computing, for each of a number of lag times for each potential independent variable, a correlation with the variable of interest;
selecting, by the computer system, potential-independent-variable/lag-time pairs as candidate independent variables and employing generalized logistic regression to construct forecasting models from sets of the candidate independent variables until a forecasting model with a computed fitness greater than a threshold fitness is constructed and accepted as the forecasting model; and
employing, by the computer system, the forecasting model to forecast values for the variable of interest.

9. The method of claim 8 wherein selecting, by the computer system, potential-independent-variable/lag-time pairs as candidate independent variables further includes:
for each potential-independent-variable/lag-time pair, selecting data points from historical data for the potential independent variable shifted by the lag time with respect to data points selected from historical data for the variable of interest, and computing a correlation between the selected, time-shifted data points from the historical data for the potential independent variable to the data points selected from historical data for the variable of interest; and
selecting up to a maximum number of potential-independent-variable/lag-time pairs with highest computed correlations to the variable of interest as candidate independent variables.

10. The method of claim 8 wherein employing generalized logistic regression to construct forecasting models from the candidate independent variables until a forecasting model with a computed fitness greater than a threshold fitness is constructed and accepted as the forecasting model further includes:
transforming the range of the variable of interest to [0,1]; and
while a forecasting model with a computed fitness above a threshold fitness has not yet been constructed, selecting a next set of candidate independent variables from the candidate independent variables; carrying out generalized logistic regression on the selected set of candidate independent variables with respect to the variable of interest to generate a next forecasting model; and evaluating the next forecasting model to determine a fitness for the model.

11. The method of claim 10 wherein selecting a next set of candidate independent variables further comprises:
selecting a number of sets of candidate indicators;
for each of the selected sets of candidate indicators, constructing an initial model by linear regression;
evaluating each initial model to generate a fitness metric for the initial model; and
selecting as the next set of candidate independent variables the set of candidate independent variables from which an initial model providing a best fitness metric was constructed.

12. The method of claim 10 wherein evaluating the next model to determine a fitness for the model further comprises:
using historical data for the selected set of candidate independent variables and a first set of historical data for the variable of interest to predict a second set of historical data for the variable of interest using the next forecasting model; and
compares the predicted second set of historical data for the variable of interest with a corresponding second set of historical data for the variable of interest to determine a fitness metric for the forecast model.

13. A forecasting system comprising:
one or more computer systems;
the identity of a dependent variable of interest and the identities of a plurality of candidate indicators, stored in an electronic memory of the one or more computer systems, along with historical data or stored references to historical data accessible to the computational forecasting system through electronic communications;
an independent-variable selection component generates correlations to the dependent variable of interest and lag times for the candidate indicators;
a model-generation component that, using a generalized logistic regression method, generates forecasting models for the dependent variable of interest until a forecasting model that meets an acceptance criterion or criteria is obtained; and
a forecasting component that generates values for the dependent variable of interest.

14. The forecasting system of claim 13 wherein the independent-variable selection component uses the generated correlations and lag times to select a number of the candidate indicators as a set of independent variables that are stored in an electronic memory of the computer system.

15. The forecasting system of claim 14 wherein the independent-variable selection component selects a number of the candidate indicators as a set of independent variables by:
for each candidate indicator, for each currently considered lag time selected from a set of lag times, selecting data points from historical data for the candidate indicator shifted by the currently considered lag time with respect to data points selected from historical data for the dependent variable of interest, and computing a correlation between the selected, time-shifted data points from the historical data for the candidate indicator to the data points selected from historical data for the dependent variable of interest;
selecting as independent variables zero, one, or more lag times for which the computed correlation coefficient is greater or equal to a threshold value; and storing the selected lag times and
computed correlation coefficients in association with a reference to the candidate indicator in memory.

16. The forecasting system of claim 13 wherein the model-generation component generates forecast models for the dependent variable of interest until a model that meets an acceptance criterion or criteria is obtained by:
- transforming the range of the dependent variable of interest to [0,1]; and
- iteratively, selecting a next set of candidate independent variables;
- carrying out regression on the candidate independent variables with respect to the dependent variable of interest to generate a next model; and
- evaluating the next model until the most recently evaluated next model meets the acceptance criterion or criteria.

17. The forecasting system of claim 16 wherein selecting a next set of candidate independent variables further comprises:
- selecting a number of sets of independent variables;
- for each set of independent variables, constructing an initial model by linear regression;
- evaluating each initial model to generate a fitness metric for the initial model; and
- selecting as the next set of candidate independent variables the set of independent variables from which an initial model providing a best fitness metric was constructed.

18. The forecasting system of claim 17 further comprising:
- a forecasting-model-evaluation component that uses historical data for the independent variables and a first set of historical data for the dependent variable of interest to predict a second set of historical data for the dependent variable of interest using a forecast model; and
- compares the predicted second set of historical data for the dependent variable of interest with a corresponding second set of historical data for the dependent variable of interest to determine a fitness metric for the forecast model.

19. The forecasting system of claim 18 further comprising:
- a forecast-model-selection component that selects a forecast model, from a number of generated forecast models constructed from different sets of independent variables, based on the fitness metrics determined for the number of generated forecast models by the forecasting-model-evaluation component.

20. The forecasting system of claim 13 wherein the forecasting component employs a generated forecasting model that meets the acceptance criterion or criteria to generate values for the dependent variable of interest.

\* \* \* \* \*

UNITED STATES PATENT AND TRADEMARK OFFICE
CERTIFICATE OF CORRECTION

PATENT NO.       : 8,374,982 B2
APPLICATION NO.  : 12/687458
DATED            : February 12, 2013
INVENTOR(S)      : Jerry Z. Shan et al.

It is certified that error appears in the above-identified patent and that said Letters Patent is hereby corrected as shown below:

Please replace the Title Page with the new Title Page attached.

In the Drawings

In Sheet 1 of 15, Figure 1, delete "Sheet 1 of 15" and insert
-- Replacement Sheet 1 of 15 --, therefor. (see attached sheet)

In Sheet 2 of 15, Figure 2, delete "Sheet 2 of 15" and insert
-- Replacement Sheet 2 of 15 --, therefor. (see attached sheet)

In Sheet 3 of 15, Figure 3, delete "Sheet 3 of 15" and insert
-- Replacement Sheet 3 of 15 --, therefor. (see attached sheet)

In Sheet 4 of 15, Figure 4A, delete "Sheet 4 of 15" and insert
-- Replacement Sheet 4 of 15 --, therefor. (see attached sheet)

In Sheet 5 of 15, Figure 4B, delete "Sheet 5 of 15" and insert
-- Replacement Sheet 5 of 15 --, therefor. (see attached sheet)

In Sheet 6 of 15, Figure 4C, delete "Sheet 6 of 15" and insert
-- Replacement Sheet 6 of 15 --, therefor. (see attached sheet)

In Sheet 7 of 15, Figure 5, delete "Sheet 7 of 15" and insert
-- Replacement Sheet 7 of 15 --, therefor. (see attached sheet)

In Sheet 8 of 15, Figure 6, delete "Sheet 8 of 15" and insert
-- Replacement Sheet 8 of 15 --, therefor. (see attached sheet)

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,374,982 B2

In Sheet 9 of 15, Figure 7, delete "Sheet 9 of 15" and insert
-- Replacement Sheet 9 of 15 --, therefor. (see attached sheet)

In Sheet 10 of 15, Figure 8, delete "Sheet 10 of 15" and insert
-- Replacement Sheet 10 of 15 --, therefor. (see attached sheet)

In Sheet 11 of 15, Figure 9, delete "Sheet 11 of 15" and insert
-- Replacement Sheet 11 of 15 --, therefor. (see attached sheet)

In Sheet 12 of 15, Figure 10A, delete "Sheet 12 of 15" and insert
-- Replacement Sheet 12 of 15 --, therefor. (see attached sheet)

In Sheet 13 of 15, Figure 10B, delete "Sheet 13 of 15" and insert
-- Replacement Sheet 13 of 15 --, therefor. (see attached sheet)

In Sheet 14 of 15, Figure 10C, delete "Sheet 14 of 15" and insert
-- Replacement Sheet 14 of 15 --, therefor. (see attached sheet)

In Sheet 15 of 15, Figure 10D, delete "Sheet 15 of 15" and insert
-- Replacement Sheet 15 of 15 --, therefor. (see attached sheet)

In the Claims

In column 9, line 63, in Claim 1, delete "indicators;" and insert
-- indicators, --, therefor.

In column 10, line 32, in Claim 2, delete "storing, the selected lag," and insert
-- storing the selected lag --, therefor.

(12) United States Patent
Shan et al.

(10) Patent No.: US 8,374,982 B2
(45) Date of Patent: Feb. 12, 2013

(54) SYSTEM AND METHOD FOR CONSTRUCTING FORECAST MODELS

(75) Inventors: Jerry Z. Shan, Palo Alto, CA (US); Rajan Lukose, Oakland, CA (US); Henri J. Suermondt, Sunnyvale, CA (US); Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 12/687,458

(22) Filed: Jan. 14, 2010

(65) Prior Publication Data
US 2011/0173144 A1 Jul. 14, 2011

(51) Int. Cl.
G06F 15/18 (2006.01)
G06F 17/00 (2006.01)
G06F 17/50 (2006.01)
G06F 7/48 (2006.01)

(52) U.S. Cl. .................. 706/45; 706/12; 703/2; 703/6
(58) Field of Classification Search .................. None
See application file for complete search history.

(56) References Cited

U.S. PATENT DOCUMENTS

| | | |
|---|---|---|
| 6,839,680 B1 | 1/2005 | Liu et al. |
| 7,072,863 B1 * | 7/2006 | Phillips et al. ............ 705/36 R |
| 2003/0101449 A1 | 5/2003 | Bentolila et al. |
| 2003/0236738 A1 * | 12/2003 | Lange et al. ............ 705/37 |
| 2008/0126176 A1 | 5/2008 | Iguchi |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava.
Hongjun Lu et al.: "Extending a Web Browser with Client-Side Mining," Hong Kong University of Science and Technology Department of Computer Science, Clear Water Bay, Kowloon, Hong Kong, China, 2003.
Shankar et al.: "Personalized Web Search Based on Client Side Ontology", CS 498. B Tech Project, 10. IIT Kanpur, India 2010.
Sendhikumar et al.; "Personalized ontology for web search personalization" 1. Anna University, Chennai, India , 2008.
Shahabi et al.; "Yoda an Accurate and Scalable Web based Recommendation System?" University of Southern California, Los Angeles, Sep 2001.
Why Wubat? Website User Behavior & Analysis Tool, Wubat, Online, http://www.wubat.com/. Copyright: 2008.

(Continued)

Primary Examiner — Alan Chen

(57) ABSTRACT

Embodiments of the present invention include a computational forecasting system that includes an identity of a dependent variable of interest and identities of a plurality of candidate indicators along with historical data or stored references to historical data, forecast-problem parameters stored in an electronic memory of the one or more electronic computers, an independent-variable selection component that generates correlations to the dependent variable of interest and lag times for the candidate indicators, and uses the generated correlations and lag times to select a number of the candidate indicators as a set of independent variables, and a model-generation component that, using a regression method, generates forecast models for the dependent variable of interest until a model that meets an acceptance criterion or criteria is obtained.

20 Claims, 15 Drawing Sheets